US012434689B2

(12) United States Patent
Yuan et al.

(10) Patent No.: US 12,434,689 B2
(45) Date of Patent: Oct. 7, 2025

(54) AUTOMATED VEHICLE PARKING

(71) Applicant: Apollo Autonomous Driving USA LLC, Sunnyvale, CA (US)

(72) Inventors: Baoping Yuan, Sunnyvale, CA (US); Yaoming Shen, Sunnyvale, CA (US)

(73) Assignee: Apollo Autonomous Driving USA LLC, Sunnyvale, CA (US)

( * ) Notice: Subject to any disclaimer, the term of this patent is extended or adjusted under 35 U.S.C. 154(b) by 167 days.

(21) Appl. No.: 18/484,814

(22) Filed: Oct. 11, 2023

(65) Prior Publication Data
US 2025/0018932 A1 Jan. 16, 2025

Related U.S. Application Data

(63) Continuation-in-part of application No. 18/349,912, filed on Jul. 10, 2023.

(51) Int. Cl.
B60W 30/06 (2006.01)
B60W 10/18 (2012.01)
B60W 40/076 (2012.01)
B60W 40/13 (2012.01)
B60W 60/00 (2020.01)

(52) U.S. Cl.
CPC .......... *B60W 30/06* (2013.01); *B60W 10/182* (2013.01); *B60W 40/076* (2013.01); *B60W 40/13* (2013.01); *B60W 60/001* (2020.02); B60W 2520/30 (2013.01); B60W 2530/10 (2013.01); B60W 2552/15 (2020.02); B60W 2554/60 (2020.02); B60W 2710/207 (2013.01)

(58) Field of Classification Search
CPC .. B60W 30/06; B60W 10/182; B60W 40/076; B60W 40/13; B60W 60/001; B60W 2520/30; B60W 2530/10; B60W 2552/15; B60W 2554/60; B60W 2710/207
See application file for complete search history.

(56) References Cited

U.S. PATENT DOCUMENTS 6,577,942 B1 * 6/2003 Moore ................ B60T 8/17616
701/76
2007/0001510 A1 * 1/2007 Miller ................... B60T 8/1764
303/149

FOREIGN PATENT DOCUMENTS

| AU | 2014316433 A | 2/2016 |
| CN | 115230733 A | 6/2024 |
| JP | 2004058937 A | 2/2004 |

OTHER PUBLICATIONS

U.S. Appl. No. 18/349,912—Non-Final Rejection dated Feb. 14, 2025.

* cited by examiner

*Primary Examiner* — Daryl C Pope
(74) *Attorney, Agent, or Firm* — Oppedahl Patent Law Firm LLC

(57) ABSTRACT

Embodiments herein relate to robust methodologies for autonomous parking. In one or more embodiments, an autonomous vehicle may determine the slope of a road based upon one or more inputs and a pre-defined slope definition and may also determine curb/no curb status of a parking location. Given the determined road conditions, such as slope and no curb/curb, embodiments determine wheel direction and angle that the vehicle should achieve to properly park. Embodiments also include countermeasures if one or more issues prohibit the vehicle from achieving a desired parking condition.

20 Claims, 29 Drawing Sheets

AUTOMATED VEHICLE PARKING

CROSS-REFERENCE TO RELATED APPLICATION

This patent application is related to and claims priority benefit under 35 USC § 120 as a continuation-in-part to co-pending and commonly-owned U.S. patent application Ser. No. 18/349,912, filed on 10 Jul. 2023, entitled "SYSTEMS AND METHODS FOR MONITORING AND CONTROLLING A VEHICLE WITH REDUNDANT BRAKING SYSTEMS," and listing Baoping Yuan and Yaoming Shen as inventors, which patent document is incorporated by reference herein in its entirety and for all purposes.

TECHNICAL FIELD

Embodiments of the present disclosure relate generally to operating autonomous driving vehicles. More particularly, embodiments of the disclosure relate to the handling of parking a vehicle under different conditions.

It shall be noted that the subject matter discussed in the background section should not be assumed to be prior art merely because of it being mentioned in this background section. Similarly, a problem mentioned in the background section or associated with the subject matter of the background section should not be assumed to have been previously recognized in the prior art. The subject matter in the background section merely represents different approaches, which in and of themselves may also be inventions.

BACKGROUND

Currently, some vehicles are equipped with the ability to operate in an autonomous mode (or nearly autonomous mode). Vehicles operating in an autonomous mode (e.g., driverless) can relieve the driver of at least some driving-related responsibilities. When operating in an autonomous mode, the vehicle can navigate to various locations using onboard sensors, allowing the vehicle to travel with minimal human interaction or in some cases without any passengers.

For a vehicle, whether in autonomous mode or not, brake control is a critical operation. As most autonomous or assisted driving (AD) vehicles use electrical power to operate the braking system (e.g., either indirectly via a hydraulic/pneumatic system in which an electrical motor powers a pump or a valve; or directly actuating a component that causes friction), a braking system may fail if either the electrical power supply (e.g., the batteries and/or power supply circuitry), or an actuator (e.g., an electrical motor driving pumps or a hydraulic/pneumatic system that provides braking actuation pressures) malfunctions, among other failure possibilities. Because braking is such a critical function, some vehicles have one or more additional braking systems, which can provide additional or backup braking. Due to its backup nature, conventional backup braking systems provide only some of the operation controls corresponding to those in the primary braking system.

Another important function of operating a vehicle is parking. Proper vehicle parking is more complicated than one might first think. If one considers various factors, such as road conditions, it is much more involved. Not only can proper parking be more involved than one might initially imagine, but it is also crucial for several reasons. First, efficient parking helps maintain smooth traffic flow within parking lots and on streets. Improperly parked vehicles can block lanes, create congestion, and lead to traffic jams. Thus, parking should be performed as quickly as possible. Second, proper parking ensures safety relative to others. Illegally parked vehicles can impede pedestrian and bike pathways, impede normal traffic flow, and/or impede the response time of emergency vehicles-all of which can potentially endanger lives. Third, parking has legal compliance aspects. Parking regulations are in place to maintain order and safety. Violating parking rules can result in fines, towing, or other legal consequences. Finally, parking involves additional safety concerns related to potential failures. Proper safe parking requires considering the parking conditions (e.g., whether there is a curb or no curb, whether the vehicle is on a slope, and which direction that slope is relative to the car). Parking a vehicle with an incorrect configuration for the road conditions may result in accidents.

While vehicle parking may seem rather commonplace, it actually is rather complex due to the various rules and considerations involved-proper parking is essential for maintaining order, safety, and accessibility. It plays a critical role in ensuring the efficient use of space, reducing traffic congestion, and supporting safe conditions for the general community.

Accordingly, what is needed are systems and methods that can autonomously determine and apply proper parking for a vehicle.

BRIEF DESCRIPTION OF THE DRAWINGS

References will be made to embodiments of the disclosure, examples of which may be illustrated in the accompanying figures. These figures are intended to be illustrative, not limiting. Although the disclosure is generally described in the context of these embodiments, it should be understood that it is not intended to limit the scope of the disclosure to these particular embodiments. Items in the figures may not be to scale.

DETAILED DESCRIPTION

Figure 1:
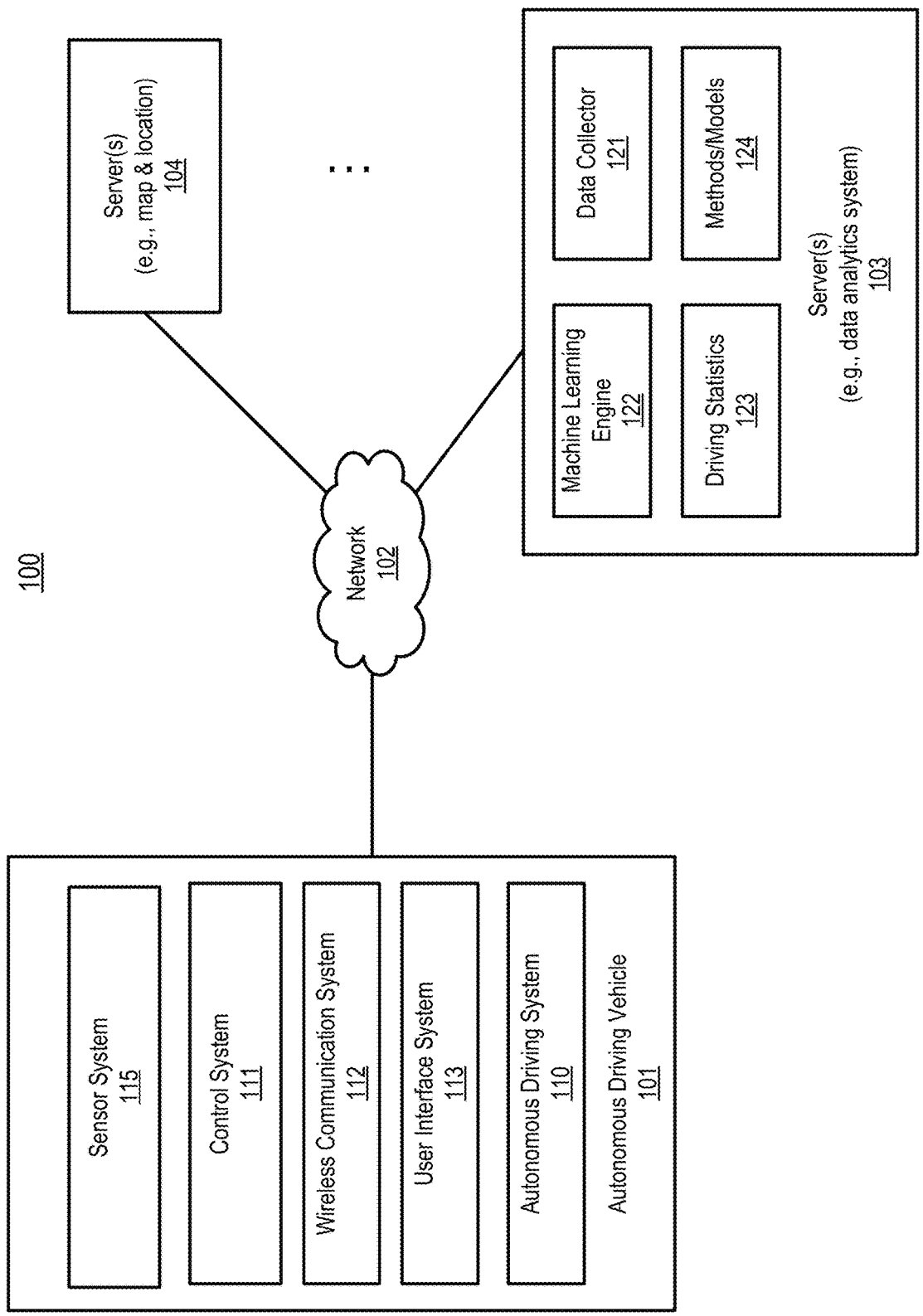
FIG. 1 is a block diagram illustrating a networked system, according to embodiments of the present disclosure.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures. Furthermore, one skilled in the art will recognize that embodiments of the present disclosure, described below, may be implemented in a variety of ways, such as a process, an apparatus, a system, a device, or a method on a tangible computer-readable/processor-readable medium.

Components, or modules, shown in diagrams are illustrative of exemplary embodiments of the disclosure and are meant to avoid obscuring the disclosure. It shall be understood that throughout this discussion that components may be described as separate functional units, which may comprise sub-units, but those skilled in the art will recognize that various components, or portions thereof, may be divided into separate components or may be integrated together, including, for example, being in a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," "communicatively coupled," "interfacing," "interface," or any of their derivatives shall be understood to include direct connections, indirect connections through one or more intermediary devices, and wireless connections. It shall also be noted that any communication, such as a signal, response, reply, acknowledgment, message, query, etc., may comprise one or more exchanges of information.

Reference in the specification to "one or more embodiments," "preferred embodiment," "an embodiment," "embodiments," or the like means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated. The terms "include," "including," "comprise," "comprising," or any of their variants shall be understood to be open terms, and any lists of items that follow are example items and not meant to be limited to the listed items. A "layer" may comprise one or more operations. The words "optimal," "optimize," "optimization," and the like refer to an improvement of an outcome or a process and do not require that the specified outcome or process has achieved an "optimal" or peak state. The use of memory, database, information base, data store, tables, hardware, cache, and the like may be used herein to refer to system component or components into which information may be entered or otherwise recorded. A set may contain any number of elements, including the empty set. A "value" may be a single value or may represent a range.

One skilled in the art shall recognize that: (1) certain steps may optionally be performed; (2) steps may not be limited to the specific order set forth herein; (3) certain steps may be performed in different orders; and (4) certain steps may be done concurrently.

Any headings used herein are for organizational purposes only and shall not be used to limit the scope of the description or the claims. Each reference/document mentioned in this patent document is incorporated by reference herein in its entirety.

A. General Overview

An autonomous vehicle can navigate to various locations using onboard sensors, thereby allowing the vehicle to travel with little or no human interaction. A critical aspect of any vehicle, whether autonomous or not, is braking. For a vehicle to be safe, it must be able to properly slow its progression.

As most autonomous or assisted driving vehicles use electrical power to operate the braking system (e.g., either indirectly via a hydraulic/pneumatic system in which an electrical motor powers a pump or a valve; or directly by actuating a component that causes friction), a braking system may fail. Because braking is such a critical function, some vehicles have one or more additional braking systems, which can provide additional or backup braking for the vehicle.

The multiple braking systems can provide redundancy to mitigate failure issues. For example, if not enough pressure is generated by a primary braking system (PBS), the AD control system may then engage another braking system (e.g., a secondary braking system (SBS)) to stop the vehicle. However, even with backup braking systems, multiple failures can occur.

Typically, if there is any failure, the control system will cause the vehicle to stop and not operate until the failure is verified as being fixed. Such an approach, however, provides low robustness for the vehicle—any failure, regardless of its severity, will result in termination of the current use of the vehicle until it is cleared to resume operations. Frequent halting of performance of the vehicle due to detected faults in one or more of the braking systems represents a poor balance between a passenger's (e.g., driver) experience and passenger safety.

An aspect of embodiments of the present disclosure is a recognition that there are numerous types of failures, each with varying degrees of severity. For example, a signal to a braking system may be interrupted or faulty, the electrical power supply (e.g., the batteries and/or power supply circuitry) may provide insufficient power, an actuator (e.g., an electrical motor driving pumps or a hydraulic/pneumatic system that provides braking actuation pressures) may partially or fully malfunction, among other failure possibilities. Each of these failures may have a different safety impact or severity.

Given that failures may range in severity and given that a vehicle has several braking systems, robustness can be factored into an AD vehicle by assessing the occurrence and severity of failures. For example, a single occurrence of a very severe failure may be sufficient to cause operation of the vehicle to be halted; whereas multiple occurrences of minor level failures during a driving session may not raise to a sufficient level to deem the vehicle unsafe. Thus, in one or more embodiments, a vehicle may continue to operate so long as a cumulative safety metric based upon the failures does not exceed a safety threshold level.

Thus, as explained in more detail below, failures of the braking systems may be monitored based on the conditions/status of the vehicle. A braking failure metric may be updated based upon a newly detected failure. If the braking failure metric exceeds a safety threshold limit condition, the AD control system may halt operation of the vehicle for safety reasons. Additionally, or alternatively, the AD control system may enforce certain limits (e.g., limit top speed, remote-control request, etc.) based upon the braking failure metric and/or specific detected conditions. It shall be noted that a more graduated approach to failures provides a highly robust AD control system. Embodiments herein provide a plurality of operations that may be conducted using a plurality of braking systems during AD.

It shall be noted that embodiments herein may consider a set of one or more factors or conditions when determining a failure, and different messages/failures may be recognized based upon different conditions (e.g., which system or systems are affected, vehicle speed, pressure, pressure build rate, time, etc.). It shall also be noted that different actions can be correlated to or taken based upon individual failures, cumulative failures, or both.

Embodiments of the present disclosure also provide robust methodologies for autonomous parking. In one or more embodiments, an autonomous vehicle may determine the slope of a road based upon pre-defined slope state diagram/definition and may also determine curb/no curb status. Given the determined road conditions, such as slope and no curb/curb, embodiments determine wheel direction and angle that the vehicle should achieve to properly park. Embodiments also include countermeasures if one or more obstacles occur that prohibit the vehicle from achieving a desired parking condition.

B. Embodiments for Robust Braking Failure Handling

FIG. 1 is a block diagram illustrating an autonomous driving network configuration according to one or more embodiments of the present disclosure. Referring to FIG. 1, network configuration 100 includes autonomous driving vehicle (ADV) 101 that may be communicatively coupled to one or more servers 103-104 over a network 102. Although one ADV is shown, multiple ADVs may be coupled to each other and/or coupled to servers 103-104 over network 102. Network 102 may be any type of network, such as a local area network (LAN), a wide area network (WAN) such as the Internet, a cellular network, a satellite network, an edge network, or a combination thereof, and may comprise wired, wireless, or both connectivity. Server(s) 103-104 may be any kind of server or a cluster of servers, such as Web or cloud servers, application servers, backend servers, or a combination thereof. Servers 103-104 may be data analytics servers, content servers, traffic information servers, map and point of interest (MPOI) servers, location servers, etc.

An ADV refers to a vehicle that may be configured to operate in an autonomous mode in which the vehicle navigates through an environment with little or no input from a driver. Such an ADV may include a sensor system having one or more sensors that are configured to detect information about the environment in which the vehicle operates. The vehicle and its associated controller(s) may use the detected information to navigate through the environment. ADV 101 may operate in a manual mode, a fully autonomous mode, or a partially autonomous mode.

In one or more embodiments, ADV 101 includes, but is not limited to, an autonomous driving system (ADS) (or controller) 110, vehicle control system 111, wireless communication system 112, user interface system 113, and sensor system 115. ADV 101 may further include certain common components included in ordinary vehicles, such as an engine, wheels, steering wheel, transmission, etc., which may be controlled by vehicle control system 111 and/or ADS 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, wireless signals, or a combination thereof. For example, components 110-115 may be communicatively coupled to each other via a controller area network (CAN) bus. In one or more embodiments, a CAN bus is a vehicle bus standard designed to allow microcontrollers and devices to communicate with each other in applications without a host computer; it is a message-based protocol, designed originally for multiplex electrical wiring within automobiles but may also be used in many other contexts.

Figure 2:
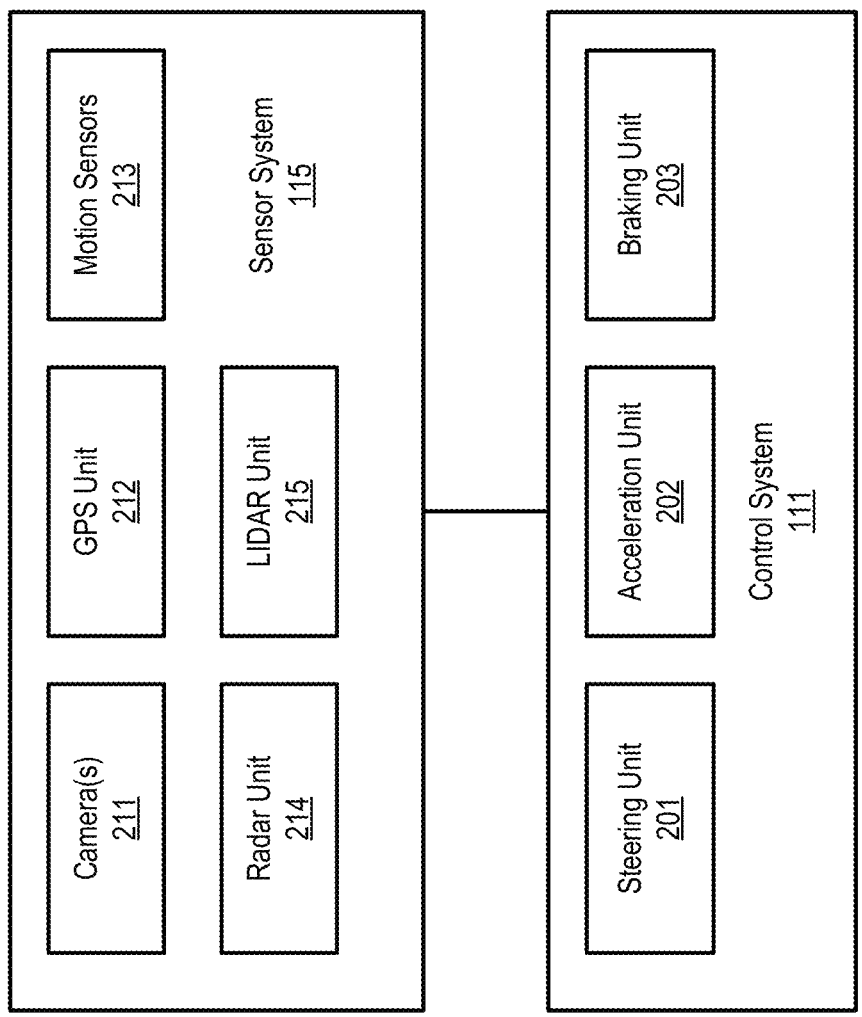
FIG. 2 is a block diagram illustrating an example of an autonomous driving vehicle, according to embodiments of the present disclosure.

Referring now to FIG. 2, in one or more embodiments, the sensor system 115 includes, but is not limited to, one or more cameras 211, a global positioning system (GPS) unit or module 212, one or more motion sensors (e.g., inertial measurement unit (IMU), accelerometer, etc.) 213, radar unit 214, and a light detection and range (LIDAR) unit 215. GPS system 212 may include a transceiver operable to provide information regarding the position of the ADV. The motion sensor unit 213 may sense position and orientation changes of the ADV based on inertial acceleration. Radar unit 214 may represent a system that utilizes radio signals to sense objects within the local environment of the ADV. In one or more embodiments, in addition to sensing objects, radar unit 214 may additionally sense the speed and/or heading of the objects. LIDAR unit 215 may sense objects in the environment in which the ADV is located using lasers. LIDAR unit 215 could include one or more laser sources, a laser scanner, and one or more detectors, among other system components. Cameras 211 may include one or more devices to capture images of the environment surrounding the ADV. Cameras 211 may be still cameras and/or video cameras. A camera may be mechanically movable, for example, by mounting the camera on a rotating and/or tilting a platform.

Sensor system 115 may further include other sensors, such as a sonar sensor, an infrared sensor, a steering sensor, a throttle sensor, a braking sensor, an audio sensor (e.g., a microphone), and a weight or mass sensor. An audio sensor may be configured to capture sound from the environment surrounding the ADV. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor. In one or more embodiments, one or more sensors may be used to determine the mass or weight of the ADV, including its occupants and any other payload. In one or more embodiments, the mass/weight may be determined using one or more factors, such as torque (e.g., wheel torque need to accelerate, braking torque needed to accelerate or decelerate, etc.). Having one or more mass/weight sensors to gauge the overall weight of the ADV and its contents (including occupants) allows the ADV to use mass and/or weight parameters for one or more determinations, such as braking, accelerating, handling, etc.

In one or more embodiments, vehicle control system 111 includes, but is not limited to, steering unit 201, throttle unit 202 (also referred to as an acceleration unit), and braking unit 203 (also referred to as the braking system 203). Steering unit 201 may be used to adjust the direction or heading of the vehicle. Throttle unit 202 may be used to control the speed of the motor or engine which in turn controls the speed and acceleration of the vehicle. Braking unit 203 may be used to decelerate the vehicle by providing friction to slow the wheels or tires of the vehicle. The steering unit 201, the acceleration unit 202, and the braking system 203 may be coupled, in part, with the AD control or AD system (e.g., ADS 110 in FIG. 3A). The details of embodiments of the braking unit 203 will be discussed below, but it shall be noted that the braking system may comprise one or more braking units or systems (e.g., a primary braking system (PBS) and a secondary braking system (SBS), which is a redundant, backup braking system of the PBS, etc.). Note that the components as shown in FIG. 2 may be implemented in hardware, software, or a combination thereof.

Referring to FIG. 1, wireless communication system 112 is to allow communication between ADV 101 and external systems, such as devices, sensors, other vehicles, etc. For example, wireless communication system 112 may wirelessly communicate with one or more devices directly or via a communication network, such as servers 103-104 over network 102. Wireless communication system 112 may use any cellular communication network or a wireless local area network (WLAN), e.g., using WiFi to communicate with another component or system. Wireless communication system 112 may communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of ADV 101 may be controlled or managed by ADS 110, especially when operating in an autonomous driving mode, but may also provide functionality when operating in manual mode. ADS 110 includes hardware (e.g., processor(s), memory, storage, etc.) and software (e.g., operating system, planning and routing programs, etc.) to receive information from sensor system 115, control system 111, wireless communication system 112, and/or user interface system 113, process the received information, plan a route or path from a starting point to a destination point, and then drive vehicle 101 based on the planning and control information. Alternatively, ADS 110 may be integrated with vehicle control system 111.

For example, a user as a passenger may specify a starting location and a destination of a trip, for example, via a user interface. ADS 110 obtains the trip-related data. For example, ADS 110 may obtain location and route data from an MPOI server, which may be a part of servers 103-104. The location server provides location services and the MPOI server provides map services and the POIs (points of interests) of certain locations. Additionally, or alternatively, such location and MPOI information may be cached locally in a persistent storage device of ADS 110.

While ADV 101 is moving along the route, ADS 110 may also obtain real-time traffic information from a traffic information system or server (TIS). Note that servers 103-104 may be operated by a third-party entity. Additionally, or alternatively, the functionalities of servers 103-104 may be integrated with ADS 110. Based on the real-time traffic information, MPOI information, and location information, as well as real-time local environment data detected or sensed by the sensor system 115 (e.g., obstacles, objects, nearby vehicles), ADS 110 can plan an optimal route and drive vehicle 101, for example, via control system 111, according to the planned route to reach the specified destination safely and efficiently.

Server 103 may be a data analytics system to perform data analytics services for a variety of clients. In one or more embodiments, a data analytics system 103 includes a data collector 121 and a machine learning engine 122. Data collector 121 collects driving statistics 123 from a variety of vehicles, either ADVs or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

In one or more embodiments, based on driving statistics 123, machine learning engine 122 generates or trains a set of rules, algorithms (methods), and/or predictive models 124 for a variety of purposes. For example, in one or more embodiments, methods/models 124 may include one or more algorithms or models to receive data from a plurality of sensors mounted on the ADV related to the ADV being held at or brought to a standstill, one or more methods for detecting a status of the ADV including a rolling speed of the ADV based on the data from the plurality of sensors, one or more methods to activate or deactivate one or more of the braking units (e.g., a primary brake and/or a secondary brake) in response to detecting the status of the ADV being at a particular status, which may be based upon one or more predetermined speed threshold ranges. Methods/models 124 may be uploaded on ADVs to be utilized during autonomous driving in real time.

Figure 3A:
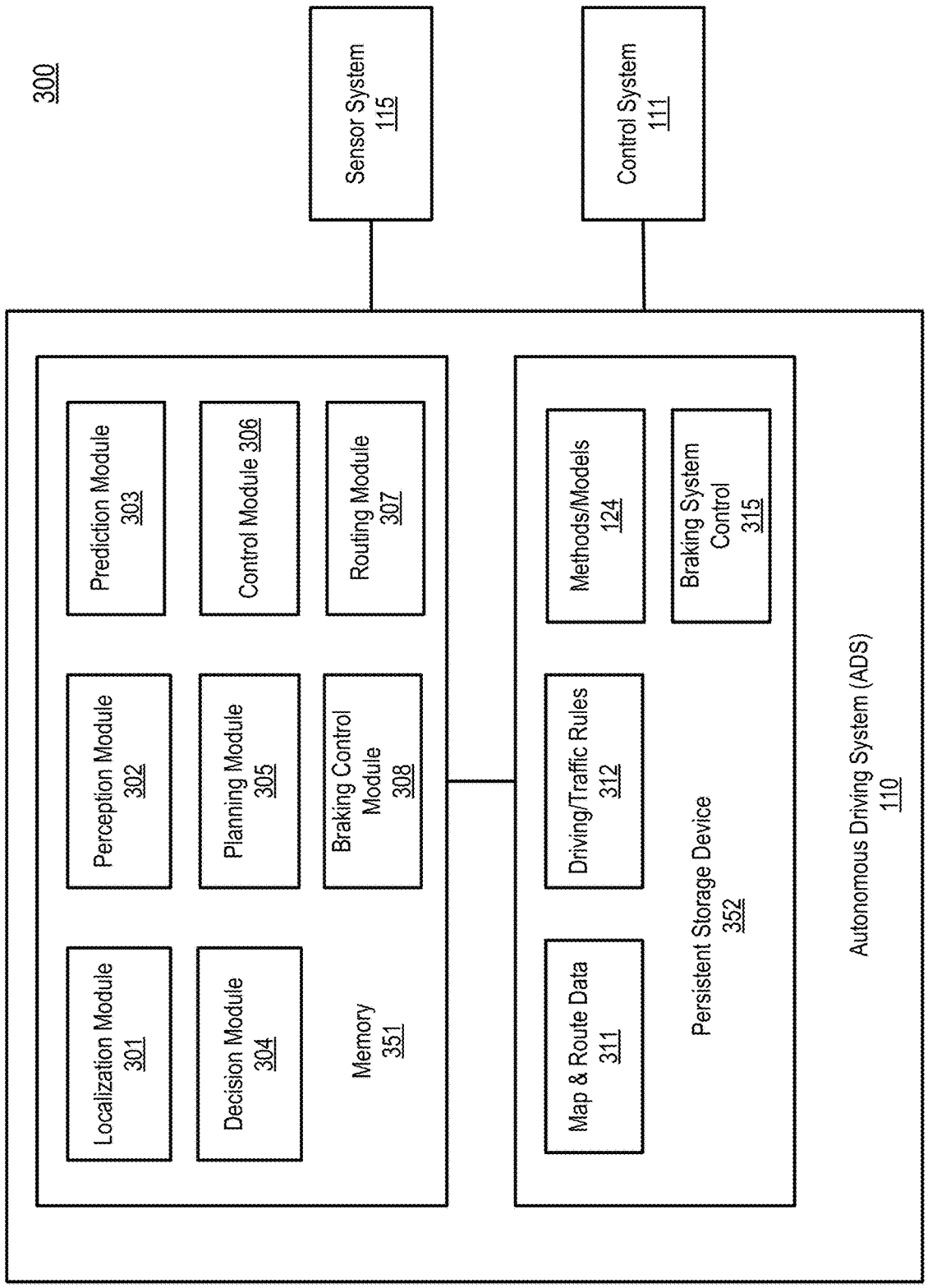
FIGS. 3A & 3B are block diagrams illustrating an example of an autonomous driving system used with an autonomous driving vehicle, according to embodiments of the present disclosure.
Figure 3B:
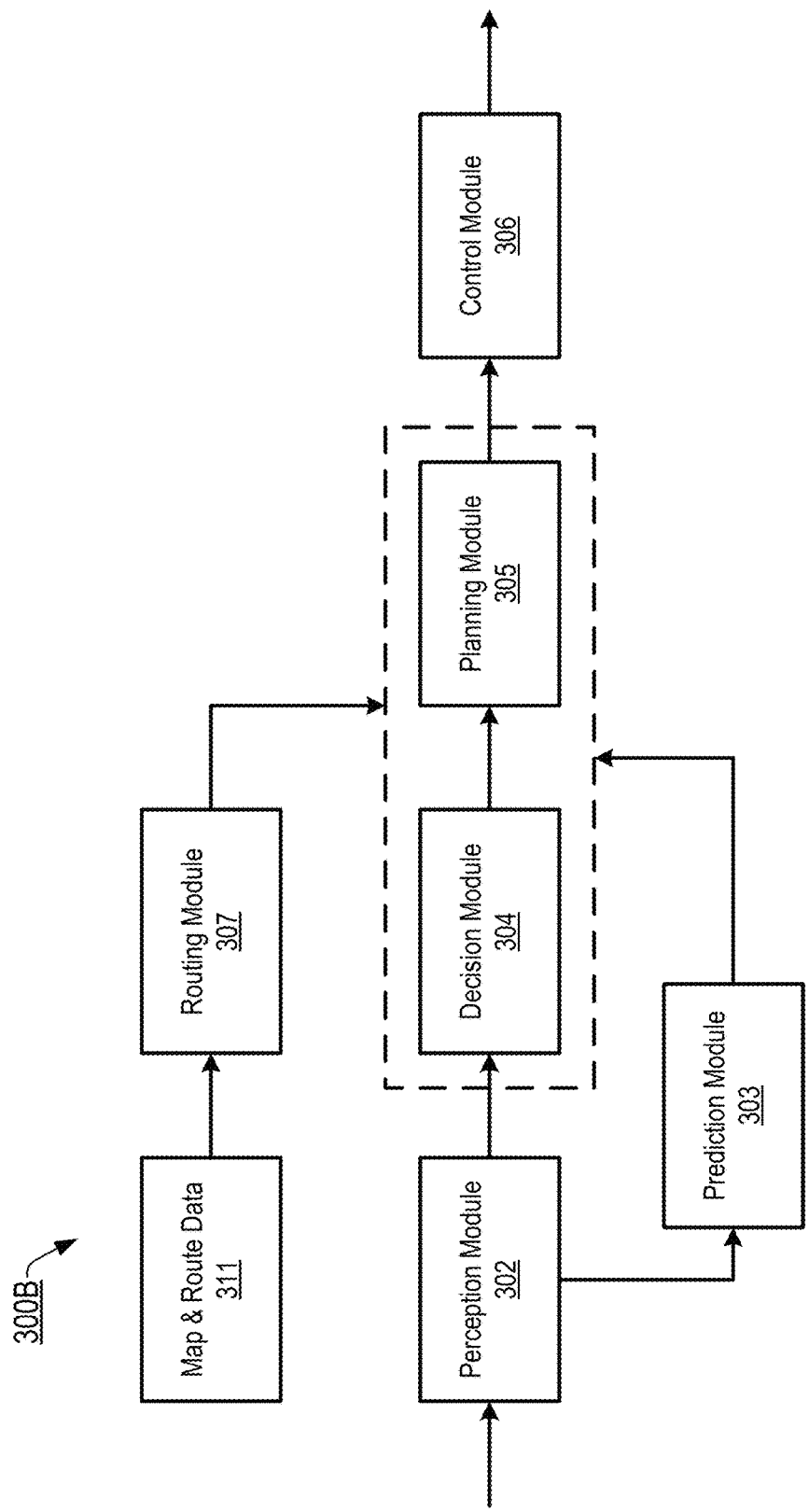

FIGS. 3A and 3B are block diagrams illustrating an example of an autonomous driving system used with an ADV, according to embodiments of the present disclosure. System 300 may be implemented as a part of ADV 101 of FIG. 1 including, but is not limited to, ADS 110, control system 111, and sensor system 115. Referring to FIGS. 3A and 3B, ADS 110 includes, but is not limited to, localization module 301, perception module 302, prediction module 303, the decision module 304, planning module 305, control module 306, routing module 307, and braking system control module 308.

Some or all of modules 301-308 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-308 may be integrated together as an integrated module.

Localization module 301 may determine a current location of ADV 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of ADV 300, such as a map and route data 311, to obtain the trip-related data. For example, localization module 301 may obtain location and route data from a location server and a map and POI (MPOI) server. A location server provides location services and an MPOI server provides map services and the POIs of certain locations, which may be cached as part of map and route data 311. While ADV 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception may include the lane configuration, traffic light signals, a relative position of another vehicle, a pedestrian, a building, a crosswalk, or other traffic-related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras to identify objects and/or features in the environment of the ADV. The objects may include traffic signals, roadway boundaries, other vehicles, pedestrians, and/or obstacles, etc. The computer vision system may use object recognition methods, video tracking, and other computer vision techniques. In one or more embodiments, the computer vision system maps an environment, tracks objects, and estimates the speed of objects, etc. Perception module 302 may also detect objects based on other sensor data provided by other sensors such as a radar and/or LIDAR.

For each of the objects, prediction module 303 predicts how the object will behave under the circumstances. The prediction may be performed based on the perception data perceiving the driving environment at the point in time given a set of map/route information 311, traffic rules 312, and/or braking system control parameters 315. For example, if the object is a vehicle in an opposing direction and the current driving environment includes an intersection, prediction module 303 may predict whether the vehicle is likely to move straight forward or make a turn. If the perception data indicates that the intersection has no traffic light, prediction module 303 may predict that the vehicle may have to fully stop before entering the intersection. If the perception data indicates that the vehicle is currently at a left-turn-only lane or a right-turn-only lane, prediction module 303 may predict that the vehicle is more likely to make a left turn or right turn, respectively.

The prediction module 303 may calculate a rate of deceleration or stop distance based on the braking system control parameters 315 to determine a safe zone for driving at a desired speed. For example, some obstacles/vehicles, road conditions, and/or safety conditions (e.g., open door) may cause the prediction module 303 to steer or decelerate to maintain safety. The braking control parameters 315 may include recorded deceleration data indicating an upper limit and/or environment-correlated deceleration rates. In one or more embodiments, the braking system control parameters 315 may be used by one or more braking systems (e.g., PBS, SBS, electric parking brake (EPB), etc.).

For each of the objects, decision module 304 may make a decision regarding how to handle the object. For example, for a particular object (e.g., another vehicle in a crossing route) as well as its metadata describing the object (e.g., a speed, direction, turning angle, etc.), decision module 304 may decide how to encounter the object (e.g., overtake, yield, stop, pass, etc.). Decision module 304 may make such decisions according to a set of rules, such as traffic rules or driving rules 312, which may be stored in persistent storage device 352.

In one or more embodiments, routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in the form of a topographic map for each of the routes it determines from the starting location to reach the destination location. A reference line refers to an ideal route or path without any interference from others such as other vehicles, obstacles, or traffic conditions. That is, if there is no other vehicle, pedestrians, or obstacles on the road, an ADV should exactly or closely follow the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 depending upon the specific driving environment at the point in time.

Based on a decision for each of the objects perceived, planning module 305 plans a path or route for the ADV, as well as driving parameters (e.g., distance, speed, and/or turning angle), using a reference line provided by routing module 307 as a basis. That is, for a given object, the decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 miles per hour (mph), then change to a right lane at the speed of 25 mph.

Based on the planning and control data, control module 306 controls and drives the ADV, by sending proper commands or signals to vehicle control system 111, according to a route or path defined by the planning and control data. In one or more embodiments, the planning and control data include sufficient information to drive the vehicle from a first point to a second point of a route or path using appropriate vehicle settings or driving parameters (e.g., throttle, braking, steering commands, etc.) at different points in time along the path or route.

In one or more embodiments, the planning phase is performed in a number of planning cycles, also referred to as driving cycles, such as, for example, in every time interval of 100 milliseconds (ms). For each of the planning cycles or driving cycles, one or more control commands may be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one or more embodiments, planning module 305 plans a route segment or path segment for the next predetermined period of time such as 5 seconds. For each planning cycle, planning module 305 plans a target position for the current cycle (e.g., the next 5 seconds) based on a target position planned in a previous cycle. Control module 306 may then generate one or more control commands (e.g., throttle, brake, steering control commands, etc.) based on the planning and control data of the current cycle.

Note that decision module 304 and planning module 305 may be integrated as an integrated module. Decision module 304/planning module 305 may include a navigation system or functionalities of a navigation system to determine a driving path for the ADV. For example, the navigation system may determine a series of speeds and directional headings to affect the movement of the ADV along a path that substantially avoids perceived obstacles while generally advancing the ADV along a roadway-based path leading to an ultimate destination. The destination may be set according to user inputs via user interface system 113. The navigation system may update the driving path dynamically while the ADV is in operation. The navigation system may incorporate data from a GPS system and one or more maps to determine the driving path for the ADV.

Figure 4A:
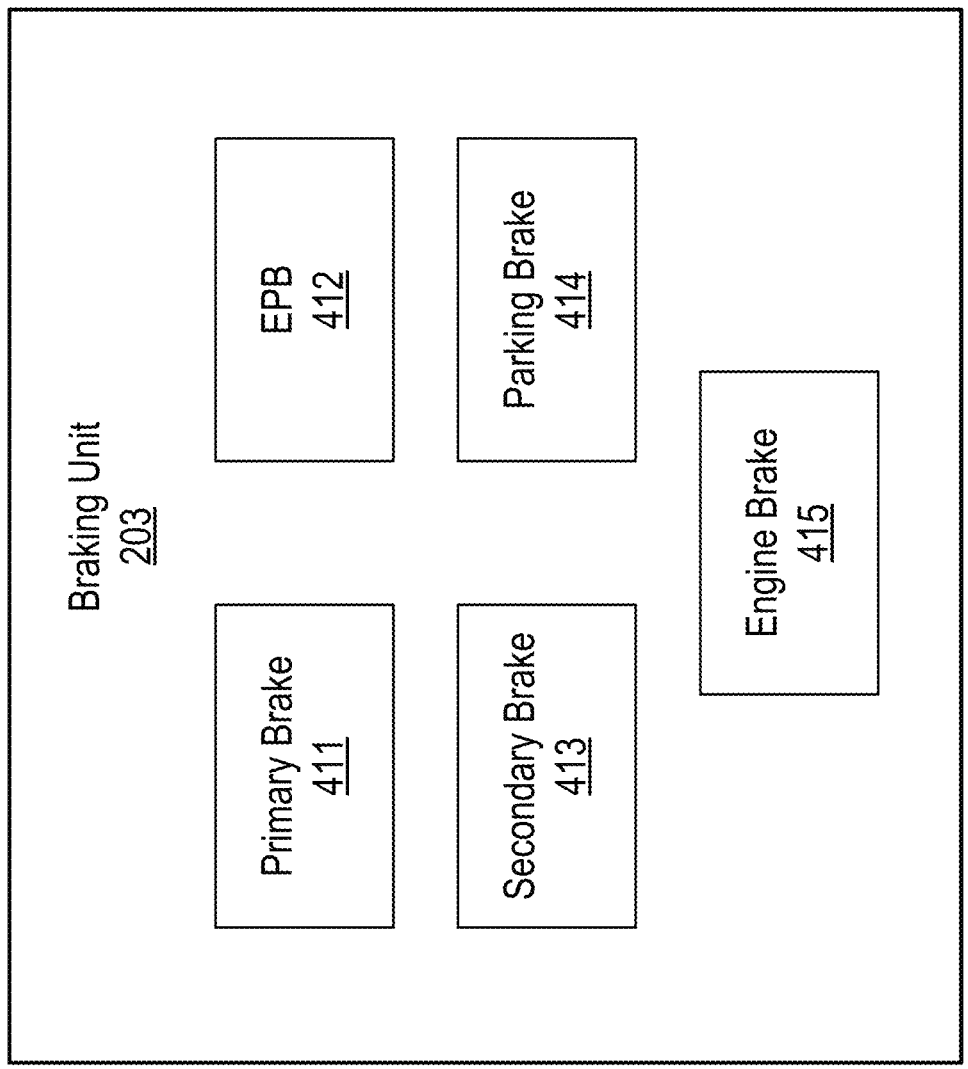
FIGS. 4A-C are block diagrams related to a braking unit and braking systems of an autonomous driving vehicle, according to embodiments of the present disclosure.
Figure 4B:
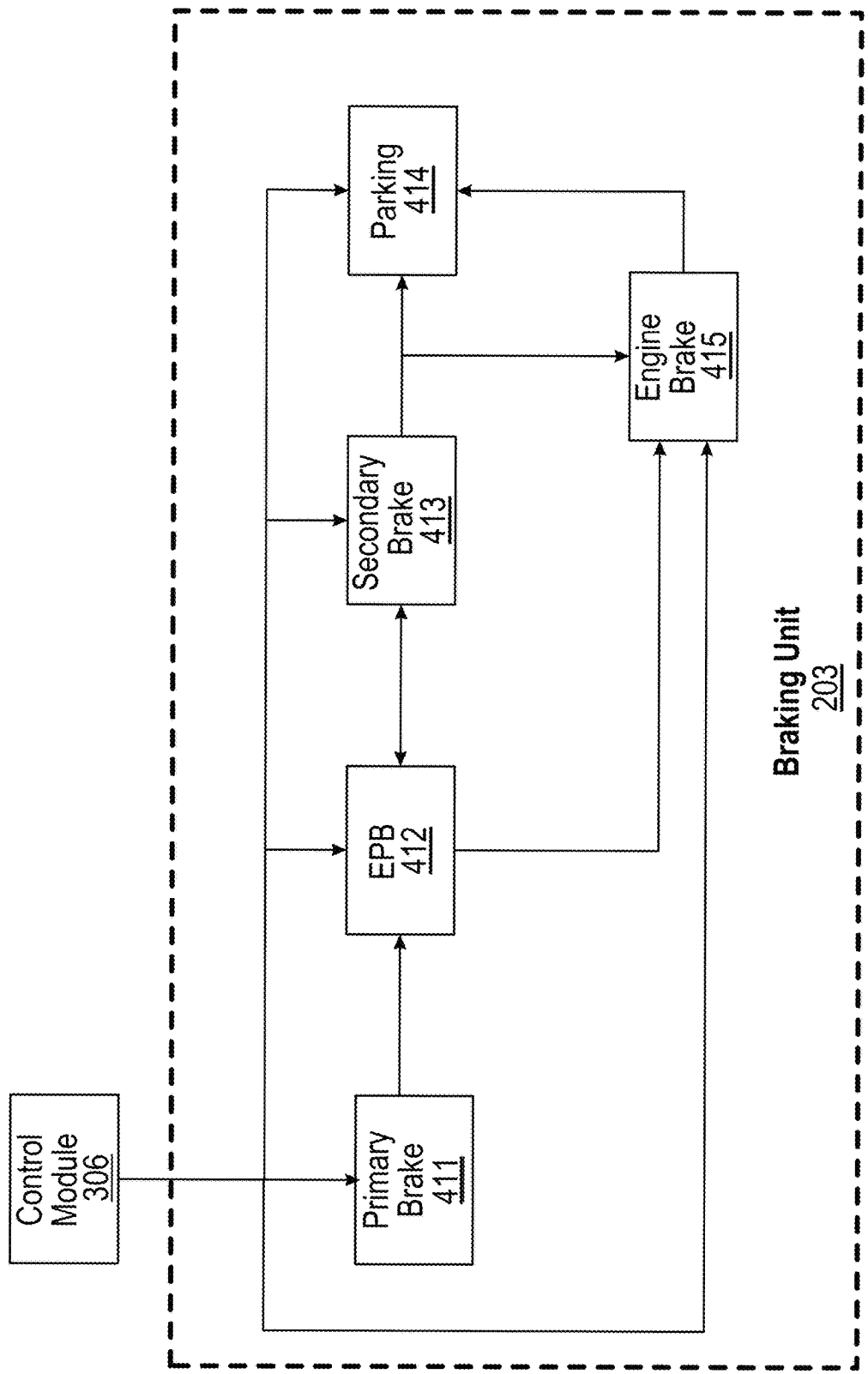

FIGS. 4A and 4B are block diagrams illustrating an example of a braking unit of a control system of an autonomous driving vehicle, according to embodiments of the present disclosure. Referring to FIG. 4A, braking unit 203 includes, but is not limited to, primary brake system (PBS) 411, EPB 412, secondary brake 413, parking 414, and/or engine brake 415. Some or all of brakes 411-415 may be implemented in hardware, software, or a combination thereof. Note that some or all of the brakes 411-415 may be communicatively coupled to or integrated with some or all of the other units of vehicle control system 111 in FIG. 2.

The primary brake 411 may control the speed of the ADV, stop the ADV, or hold the ADV to a standstill (remain stationary). The primary brake 411 may be the rear brakes, which may be used as the first defense to prevent the ADV from rolling. The primary brake 411 may be held safely; however, the primary brake may have timeout limitations (i.e., limits on how long it can hold or sustain braking pressure). The EPB 412 may be activated with a button (instead of a lever) and the brake pads may be electrically applied to the wheels of the ADV. However, the speed at which the EPB 412 activates may be slow (e.g., it may take up to two seconds for the calibers to be fully activated). The EPB may also have noise issues, which creates a negative user experience. In one or more embodiments, the secondary brake 413 may be used in the event of failure of the primary brake 411. The secondary brake 413 may be the front brakes, often pressure restricted in order to prevent the front wheels lockup and subsequent loss of steering. The secondary brake 413 may not be able to hold a high pressure for a time period exceeding a threshold, for example, 10 seconds. The secondary brake 413 may also generate noise issues. The parking brake 414 may keep a parked vehicle stationary, and the parking brake 414 may prevent the ADV from rolling down a hill or moving while at a standstill. However, it may not be safe for the parking brake 414 to hold too much weight particularly when implemented using the transmission as it may cause damage to the transmission and cause parking failure. In one or more embodiments, the ADV cannot drive with the parking brake on, which may cause damage to the braking unit. The ADV may need to shift from the status of "parking," in which the parking brake is on, to the status of "drive," in which the parking brake is off, in order to drive. However, the shifting mechanism may be complex. In one or more embodiments, the engine brake 415 may be used to reduce the speed of the ADV. In one or more embodiments, the engine brake 415 may be used as a last defense when all other brakes have failed; however, it may be used at other times as well for braking.

Referring to FIG. 4B, the braking unit may be configured to perform a redundant holding control to balance the safety and the occupant or passenger comfort of the ADV. For example, the brake unit may be configured to hold the ADV on a slope. Different actions may be performed based on different vehicle statuses of the ADV. In one or more embodiments, the control module 306 controls and drives the ADV, by sending proper commands or signals to the vehicle control system 111 including the braking unit 203. The control module 306 and the brake unit 203 may perform the redundant holding control.

In one or more embodiments, the primary brake 411 may be used to add the wheel pressure, and a warning message may be generated. For example, the primary brake 411 may be used to add the wheel pressure in a first predetermined rate threshold range based on the status of the ADV being in a first status and/or road conditions. For example, the status of the ADV may include a rolling speed of the ADV. The status of the ADV may include a distance between the ADV and an obstacle, for example, which may be the closest obstacle behind when the ADV is rolling back or the closest obstacle ahead of the ADV when the ADV is rolling forward. The status of the ADV may include a mass of the ADV, for example. The road condition may include the friction of the road, the slope gradient of the road, etc. The status of the ADV may include a safety element, such as a door being open.

Figure 4C:
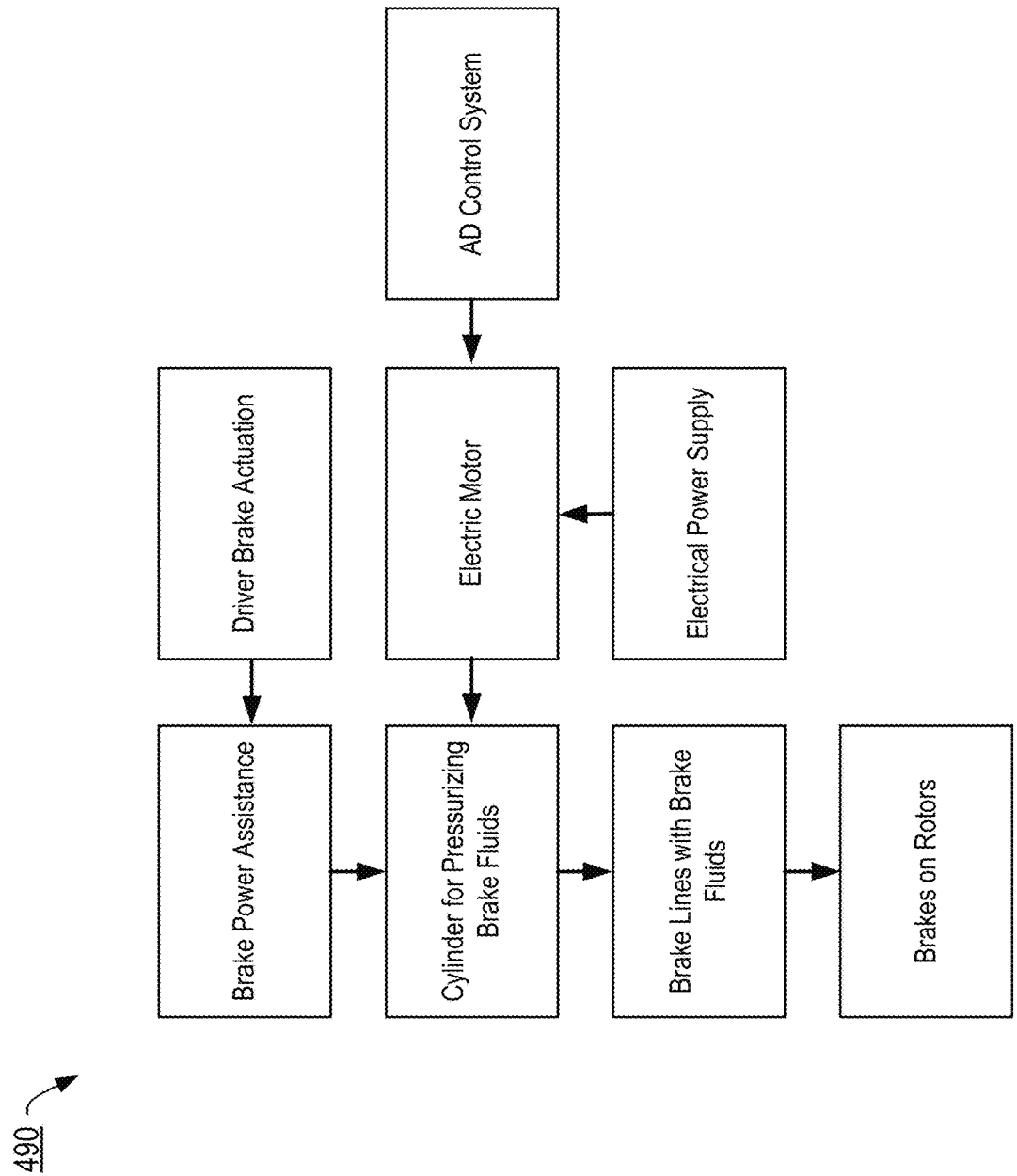

The brake control module 308 of FIG. 3A may be in control of an example brake system 490 of FIG. 4C. FIG. 4C depicts an alternative block diagram view of an example of the braking system 490, according to embodiments of the present disclosure. As shown in FIG. 4C, the braking system 409 includes at least a mechanism for receiving a braking actuation from a driver, a device for providing brake power assistance (e.g., a booster), a cylinder for pressurizing brake fluids, an electrical motor on the master cylinder, one or more brake lines with brake fluids for transmitting braking power to one or more brakes on rotors of the vehicle. The braking system 400 may also include an electrical power supply, independent from or shared with the vehicle. The braking system 490 may include or be in connection with the AD control that operates on the mentioned components/devices with sensor feedback therefrom.

Although illustrated separately, the device providing brake power assistance and the electric motor on the master cylinder may be integrated into a common device. For example, the brake actuation by the driver may provide direct actuation to the electric motor on the master cylinder. In other embodiments, the brake power assistance device may be a separate or independent (e.g., hydraulic) system to provide secondary control of the master cylinder, such as for emergency engagement when AD control does not operate as intended. As discussed herein, the brake control module 308 may reduce the power consumption by the electric motor on the master cylinder to conserve energy when the vehicle performs a traffic stop on a slope or gradient.

Figure 5:
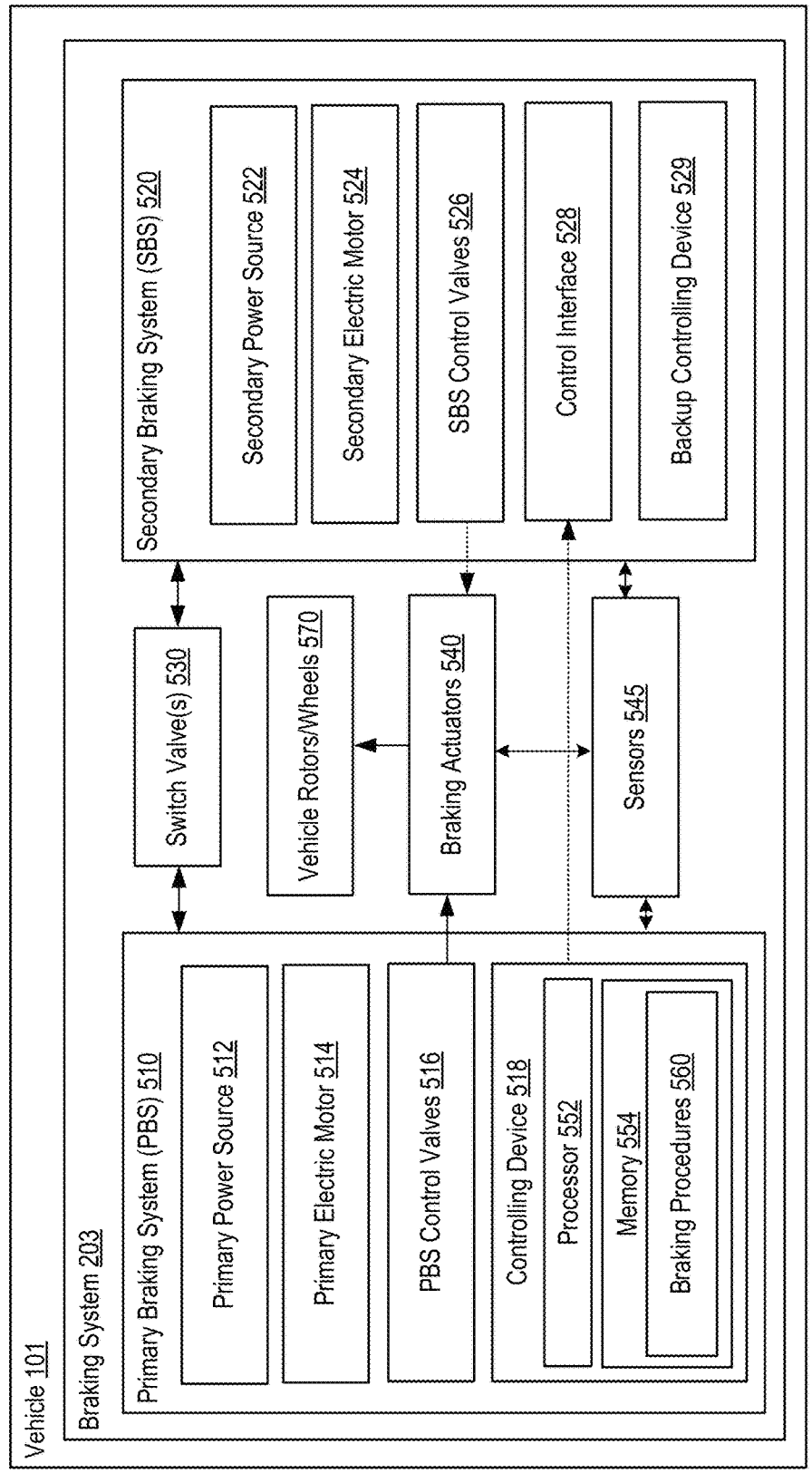
FIG. 5 is a block diagram illustrating implementations of a primary braking system (PBS) and a secondary braking system (SBS), in accordance with aspects of the present disclosure.

FIG. 5 is a block diagram 500 illustrating implementations of a primary braking system (PBS) 510 and a secondary braking system (SBS) 520, in accordance with aspects of the present disclosure. As shown, the ADV 101 includes the braking system 203, which includes the PBS 510 and the SBS 520. The braking system 203 also includes a number of switch valves 530 operable to switch between the PBS 510 and the SBS 520. The braking system 203 includes a number of braking actuators 540, each braking actuator 540 operable to apply a braking pressure on a rotor or wheel 570 of the ADV 101 to generate frictional forces to decelerate or stop the rotation thereof. The braking system 203 includes a number of sensors 545 for monitoring the operating conditions of the PBS 510, the SBS 520, the braking actuators 540, and other aspects of the braking system 203 and the vehicle 101 (e.g., rotations of the rotors or wheels 570, the switch valves 530, the orientations and rotations of the vehicle 101, etc.).

The PBS 510 may be powered by a primary power source 512. The PBS 510 may include a primary electric motor 514 to generate a primary pressure (e.g., hydraulic or pneumatic) to provide hydraulic or pneumatic power to the braking actuators 540. The PBS 510 may include a number of PBS control valves that receive the hydraulic or pneumatic power and are operable to vary respective actuating braking pressures at the braking actuators 540. The PBS 510 includes a controlling device 518 to operate the PBS control valves 516 for varying the respective actuating braking pressures at the braking actuators 540 during different braking procedures. For example, the controlling device 518 controls the braking actuators 540 to independently perform primary braking procedures including at least: (1) a primary longitudinal control, (2) a primary stability control, and (3) a primary standstill control. The sensors 545 may monitor the primary braking procedures and detect when the braking procedure and/or a related component malfunction.

The braking system 203 may include at least one switch valve 530 configured to switch the PBS 510 to the SBS 520 upon detecting, by the controlling device 518 via the sensors 545, that at least one of the primary braking procedures is malfunctioning. The controlling device 518 may include a processor 552 and a non-transitory memory 554 coupled to the processor 552. The memory 554 may include instructions for the controlling device 518 to cause the PBS 510 or the SBS 520 to perform braking procedures 560 (e.g., primary braking procedures and backup/secondary braking procedures).

As shown in FIG. 5, the SBS 520 is independent from the PBS 510 and may include a secondary power source 522 and a secondary electric motor 524. The secondary electric motor 524 is independent from the primary electric motor 514. The SBS 520 may include a number of SBS control valves 526, which are configured to operate the braking actuators 540. For example, the SBS 520 may use the secondary electric motor 524 to generate a second pressure providing the hydraulic power. The SBS 520 switches at least one switch valve 530 to operate the braking actuators 540. As such, the SBS 520 may control the braking actuators 540 independently from the PBS 510.

In one or more embodiments, the SBS control valves 526 are controlled by the controlling device 518 and are operable to independently provide backup braking procedures at the braking actuators 540. The SBS 520 may also include a backup controlling device 529 to perform the braking control procedures in case the controlling device 518 fails. The SBS 520 may include a control interface 528 for the controlling device 518 to engage various components (e.g., the SBS control valves 526) of the SBS 520. In one or more embodiments, the control interface 528 may allow the backup controlling device 529 to synchronize control parameters with the controlling device 518. When the SBS 520 is engaged, the controlling device 518 may cause the SBS 520 to perform backup braking procedures corresponding to the malfunctioning of at least one of the primary braking procedures.

In one or more embodiments, the memory 554 coupled to the processor 552 stores instructions that are executable by the processor 552. The instructions, when executed, may cause the processor 552 to receive data about obstacle conditions and road conditions. When conditions for braking are detected or satisfied, the processor 552 may disengage a power supply to one or more motors of the vehicle 101 based on the data of obstacle conditions and road conditions. The one or more motors may include at least one electric motor or an internal combustion engine. The processor 552 may then engage the first braking sub-system of the braking system to perform one or more of the primary braking procedures by default. Upon detecting that at least one of the primary braking procedures is malfunctioning by the controlling device 518 via the sensors 545, the controlling device 518 engages the SBS 520 to provide for a backup braking procedure corresponding to the malfunctioning primary braking procedure.

As shown in FIG. 5, the PBS control valves 516 and the SBS control valves 526 may respectively and independently control each of the braking actuators 540. Each of the braking actuators 540 respectively provides braking forces on each rotor or wheel 570 of the ADV 101. In one or more embodiments, the processor 552 and the memory 554 of the controlling device 518 are further configured to receive sensor data of rotation of each wheel of the ADV 101, and individually control, via the SBS control valves 526 each of the braking actuators 540 to perform various braking procedures. For example, the SBS 520 increases, in a secondary longitudinal control (e.g., AEB), a braking pressure when an emergency condition has been detected (e.g., imminent impact). The backup controlling device 529 may include a similar processor and memory as the processor 552 and the memory 554 of the controlling device 518 to provide backup braking procedures in case the controlling device 518 malfunctions.

In one or more embodiments, the SBS 520 may increase, in the secondary longitudinal control (e.g., ACC), the braking pressure to slow down the ADV 101 when a speed difference between the computer-assisted driving vehicle and one or more surrounding vehicles exceeds a threshold value (e.g., due to downhill accelerations).

In one or more embodiments, the SBS 520 may reduce, in a secondary stability control (e.g., ABS), a braking pressure (e.g., via one of the braking actuators 540) on at least one wheel 570 when the at least one wheel 570 rotates slower than other wheels to indicate locking, as measured by one of the sensors 545.

In one or more embodiments, the SBS 520 increases, in the secondary stability control (e.g., electronic stability control (ESC)), a braking pressure on at least one wheel when a difference between a desired steering direction and a measured steering direction exceeds a threshold value (e.g., understeering or oversteering).

In one or more embodiments, the SBS 520 engages, in a secondary standstill control (e.g., HAS), a parking brake when an unintended wheel rotation has been detected. The parking brake applies a braking force for holding the ADV 101 still.

In aspects, the switch valves 530 may include a first actuation valve operable to separate the second braking sub-system from the first braking sub-system that comprises a master cylinder, when the second braking sub-system is engaged upon detecting, by the controlling device via the plurality of sensors, that at least one of the primary braking procedures is malfunctioning. The first actuation valve prevents the first pressure from applying to the second braking sub-system by switching from a primary position to a secondary position. For example, in the primary position, the first actuation valve provides hydraulic fluids from a master cylinder and a booster cylinder to the first plurality of valves; and in the secondary position, the first actuation valve shuts off hydraulic fluids from the master cylinder.

In one or more embodiments, the at least one switch valve 530 further includes a second actuation valve operable to switch between a free-flow position and a check valve position. The free-flow position is used during the engagement of the second braking sub-system for receiving hydraulic fluids from the booster cylinder.

In aspects, the braking actuators 540 include a front-left braking actuator operable to apply a braking force on a front-left wheel of the computer-assisted driving vehicle; a front-right braking actuator operable to apply a braking force on a front-right wheel of the computer-assisted driving vehicle; a rear-left braking actuator operable to apply a braking force on a rear-left wheel of the computer-assisted driving vehicle; and a rear-right braking actuator operable to apply a braking force on a rear-right wheel of the computer-assisted driving vehicle. The PBS control valves 516 and the SBS control valves 526 are respectively operable to independently vary corresponding braking forces on the front-left, front-right, rear-left, and rear-right wheels. In one or more embodiments, the rear-left braking actuator and the rear-right braking actuator further include an electric or electronic park brake (EPB) respectively, or jointly. For example, the EPB may be actuated to apply a braking pressure without continuous consumption of electricity.

Figure 6A:
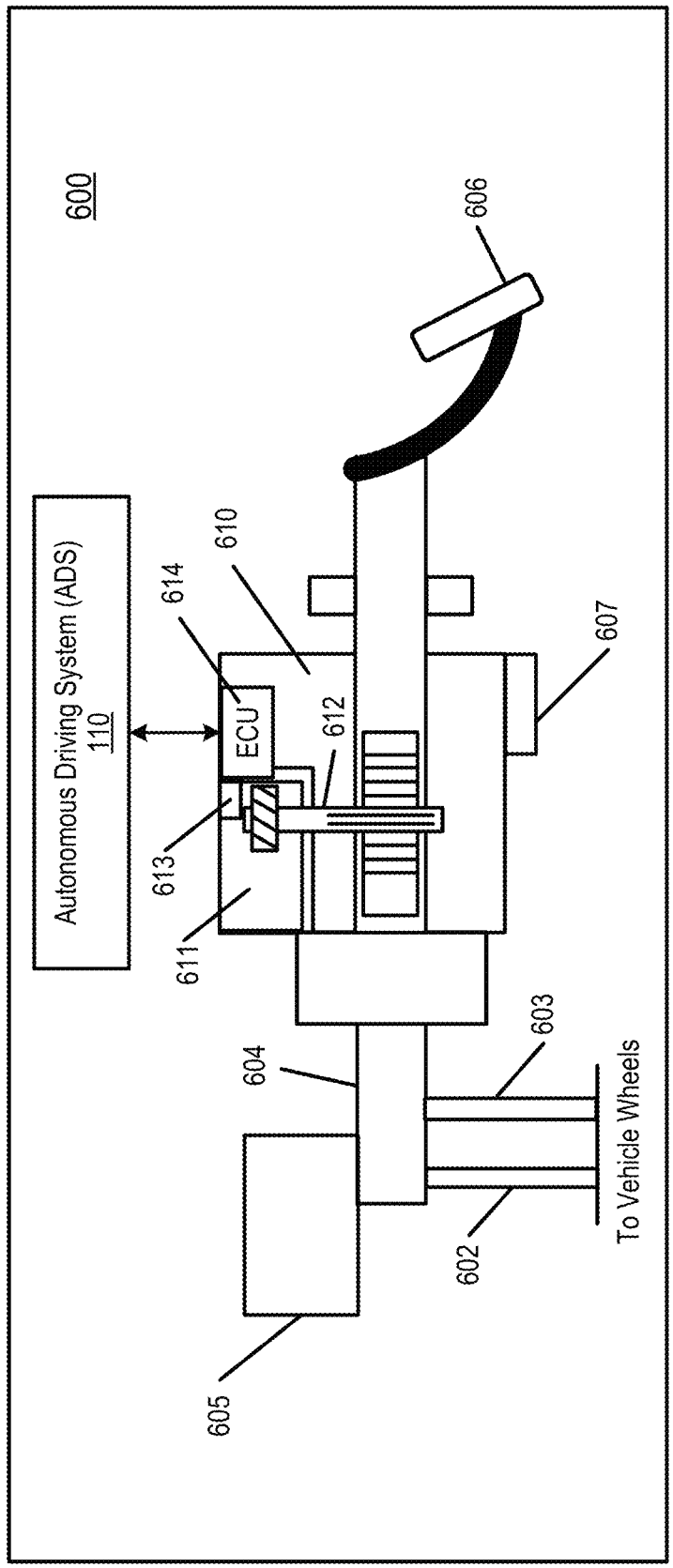
FIG. 6A shows a representation of a hydraulic brake system for a vehicle, according to embodiments of the present disclosure.

FIG. 6A shows a representation of a hydraulic brake system 600 for a vehicle, according to embodiments of the present disclosure. The vehicle brake system 600 may include a front axle brake circuit 602 and a rear axle brake circuit 603 for actuating wheel brake devices (not shown) for the wheels of the ADV using a brake fluid that is under hydraulic pressure. Brake circuits 602 and 603 may be connected to master brake cylinder 604 which is supplied with the brake fluid by a brake fluid reservoir container 605. A master brake cylinder piston within master brake cylinder 604 is operable via brake pedal 606.

In one or more embodiments, the brake system 600 includes a braking force booster 610 that is coupled between brake pedal 606 and master brake cylinder 604. Booster 410 may include an electric motor 611, mechanical gearbox 612, and an electronic control unit (ECU) 614. In one or more embodiments, ECU 614 comprises a microcontroller that controls the actuations of booster 610. Booster 610 may boost a brake control that is applied by an operator. For example, a brake pedal travel distance that is exerted by an operator may be measured by a pedal travel sensor 607. A signal of pedal travel sensor 607 may be transmitted from ADS 110 to ECU 614 of booster 610 to cause gears of a mechanical gearbox 612 to rotate thereby boosting the applied brake pedal and causing the hydraulic brake pressure at master brake cylinder 604 to increase. In one or more embodiments, the actuation position of electric motor 611 may be measured by an actuation sensor 613.

In one or more embodiments, brake fluid may be carried in each brake circuit 602 and 603 and is supplied to brake devices (not shown) of the vehicle wheels. The brake hydraulics may further include a hydraulic pump (not shown) to control the hydraulic brake pressure of the brake hydraulics.

For an autonomous driving mode, an ADS may request brake controls (e.g., a pedal travel distance) by sending a signal from ADS 110 to ECU 614 of booster 610 to cause gears of the mechanical gearbox 612 to rotate and to actuate the piston of the master brake cylinder 604. Furthermore, a brake control system may obtain sensor values from ECU 614 of booster 610 to obtain measurements of travel sensor 607 and/or actuation sensor 613.

In one or more embodiments, ADS 110 may provide information to ECU 614 to apply accurate brake hold pressure while ADV 101 is stopped on a gradient or at other times. Referring to FIG. 3B, planning module 305, control module 306, and/or other modules may perform the computations, determinations, and steps required to instruct the braking system (e.g., ECU 614) of the accurate brake hold pressure.

Although the vehicle brake hydraulics system is described with brake fluid hydraulics, the embodiments are not limited to fluid hydraulic brakes. For example, an electronic brake system may be used instead of the fluid hydraulics brake system.

Figure 6B:
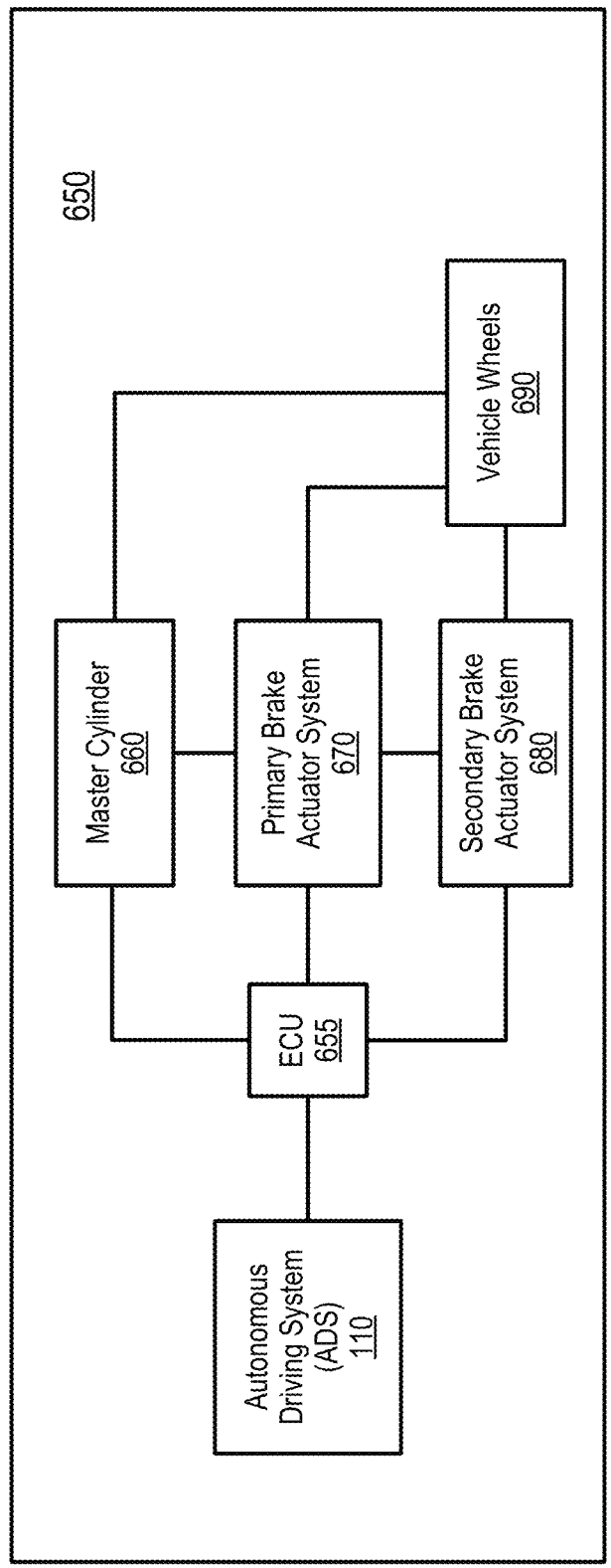
FIG. 6B is a diagram illustrating an example of a redundant Drive-By-Wire (DBW) brake system for a vehicle, according to embodiments of the present disclosure.

FIG. 6B is a diagram illustrating an example of a redundant Drive-By-Wire (DBW) brake system for a vehicle, according to embodiments of the present disclosure. In one or more embodiments, DBW technology in automotive vehicles may replace or supplement traditional mechanical and hydraulic systems with mechatronic actuation and control.

The brake system 650 includes a master cylinder 660 that couples to the primary brake actuator system 670. Similar to that discussed above, ADS 110 provides information to ECU 655 to apply accurate brake hold pressure while ADV 101 is stopped on a gradient or may apply brake hold pressure in other circumstances. In one or more embodiments, the primary brake actuator system 670 includes a travel sensor, motor sensor, and motor. Primary brake actuator system 670 may be coupled to secondary brake actuator system 680. In one or more embodiments, secondary brake actuator system 680 receives brake hold pressure information from primary brake actuator system 670 and applies an appropriate braking force to vehicle wheels 690 accordingly.

Figure 7A:
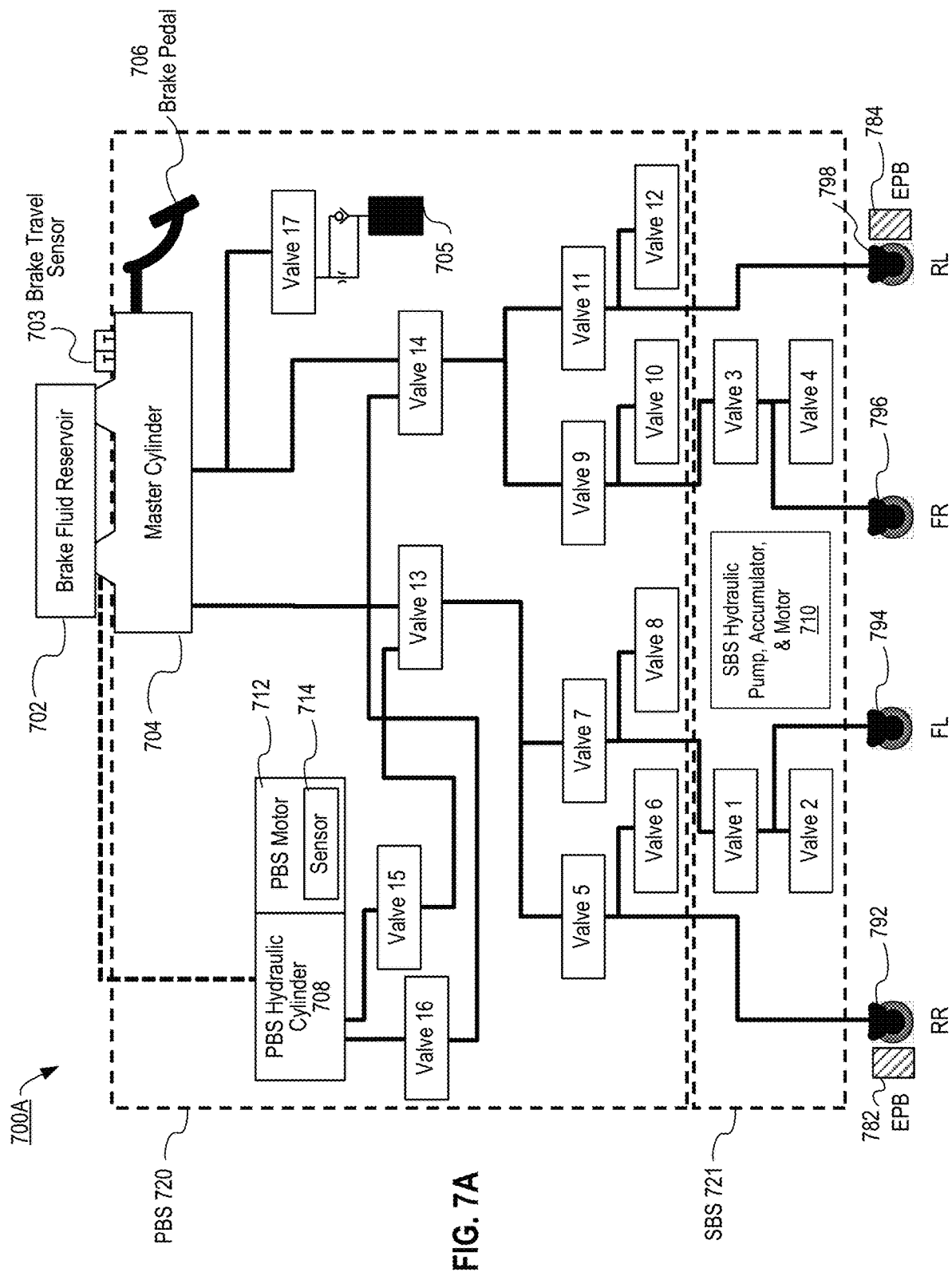
FIGS. 7A & 7B illustrate alternative representations of braking units (which includes a PBS and an SBS) for a vehicle, according to embodiments of the present disclosure.

FIG. 7A illustrates an alternative example representation of a braking unit 700 including a PBS 720 and a SBS 721, according to embodiments of the present disclosure. For clarity, not all diagram blocks within box 720 belong to the PBS 720. For example, some components illustrated in box 720 may belong to a system level or be shared with the SBS 721.

As shown, the PBS 720 includes a master cylinder 704. The master cylinder 704 might use an optional booster in some embodiments (e.g., the booster may amplify the pressure output of the master cylinder 704). The PBS 720 includes a PBS hydraulic cylinder 708 with a PBS motor 712. One or more sensors 714 may monitor the operating conditions of the PBS motor 712 and the cylinder 708. The SBS 721 includes an SBS hydraulic pump, accumulator, and motor 710 with an SBS motor. One or more sensors (not shown) may monitor the operating conditions of the SBS motor and the SBS hydraulic pump, accumulator, and motor 710. In one or more embodiments, the SBS hydraulic pump, accumulator, and motor 710 and the SBS motor (assembly) may take the form of an ABS brake modulator in which a pump motor is integrated with one or more pumps and valves. The master cylinder 704, the PBS hydraulic cylinder 708, and the SBS hydraulic pump, accumulator, and motor 710 receive brake fluids from the brake fluids reservoir 702 (and return thereto). Also depicted is a brake travel sensor 703 that may be used to determine a brake pedal travel distance of the brake petal 706. A brake pedal travel sensor 703 signal may be transmitted to or from the ADS. Also, depicted in FIG. 7A is a brake pedal simulator 705, which is designed to replicate the driver's experience and is commonly used as a driver feeling simulator; it produces a visco-elastic brake pedal sensation, enhancing the overall realism of the simulation.

The brake fluids transfer braking pressures from the cylinders 704, 708, and 710 to the brake actuators 792, 794, 796, and 798 (e.g., in the forms of pistons and friction pads for clamping down respective rotors to slow down wheel movements). The SBS hydraulic pump, accumulator, and motor 710 may provide backup braking pressures to the PBS hydraulic cylinder 708 when engaged.

In one or more embodiments, the system 700 may include EPB that may affect one or more wheels to apply braking pressure. For example, EPB 782, 784 may be applied to the RR and RL wheels; although it shall be noted that more wheels or different wheels may have EPB applied to them.

Figure 7B:
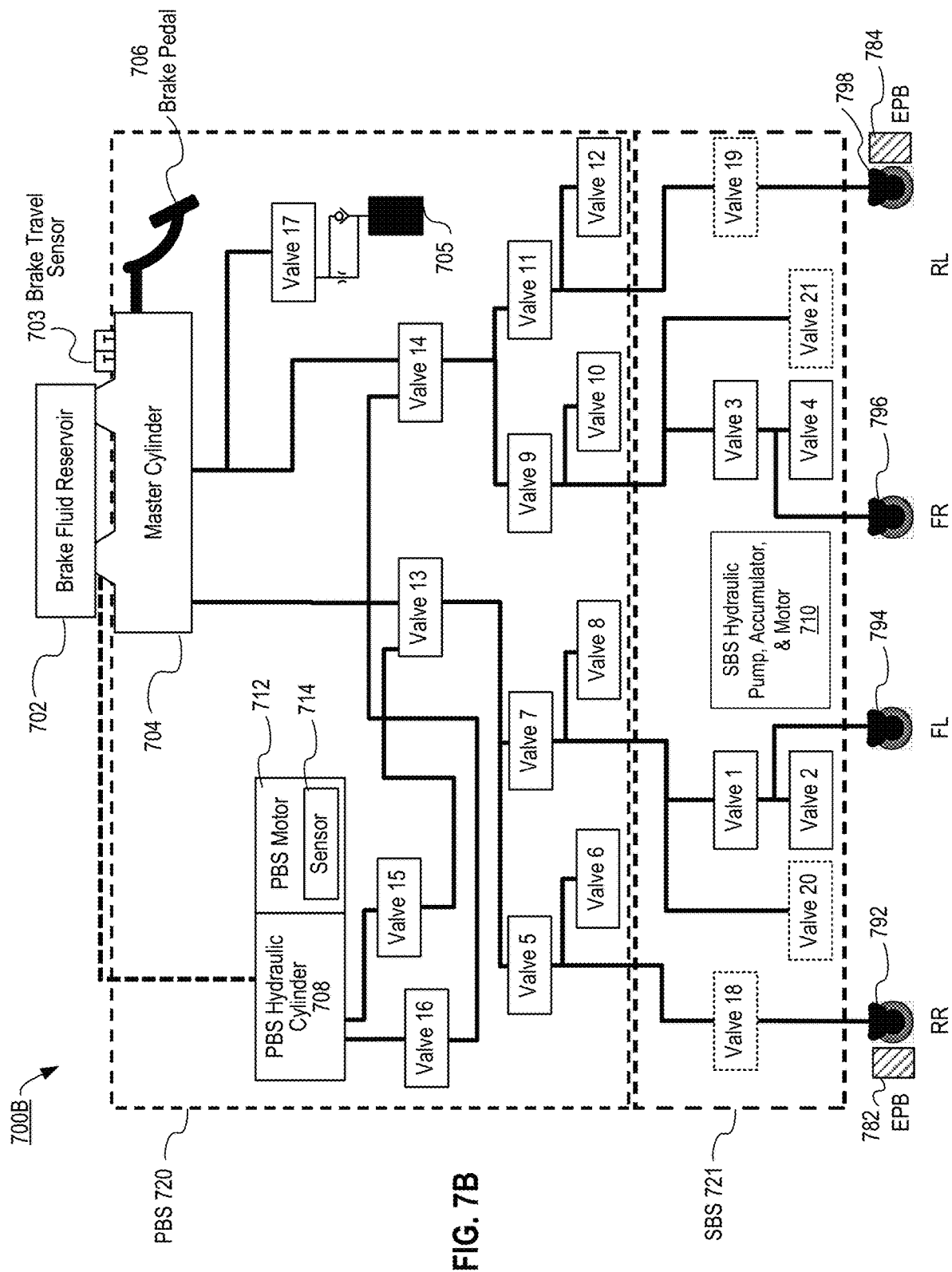

FIG. 7B illustrates yet another alternative example representation of a braking unit, according to embodiments of the present disclosure. The depicted embodiment closely resembles the system of FIG. 7A with the addition of valves 18, 19, 20, and 21. In one or more embodiments, the PBS may constantly monitor the hydraulic fluid that it applies to one or more of the wheels, and the pressure it generates may be internal to the PBS. In the embodiment depicted in FIG. 7B, additional valves (e.g., values 18, 19, 20, and 21) facilitate the SBS system to independently control hydraulic pressure to the brake calipers of the wheels of the vehicle. As noted previously, the SBS forms a backup braking system that is able to hydraulically control the brake fluid applied to at least two brakes of the vehicle in the event that a failure occurs in the PBS.

Figure 8:
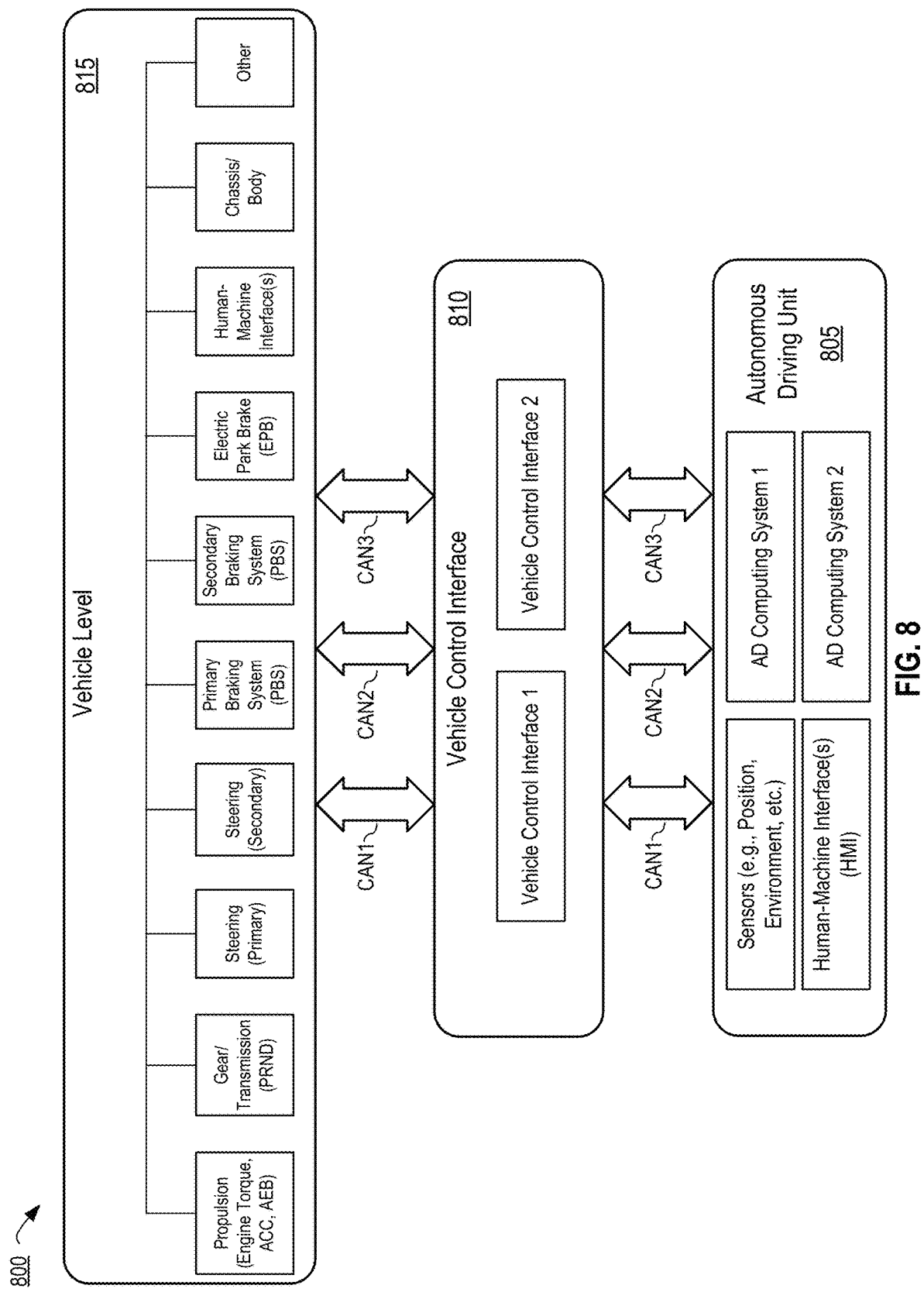
FIG. 8 is a block diagram of an example control system, in accordance with aspects of the present disclosure.

FIG. 8 is a block diagram 800 of an example control system, in accordance with aspects of the present disclosure. As shown, the example control system may include three high-level components: the autonomous driving unit 805, the vehicle control interface 810, and the vehicle level components 815.

The autonomous driving unit 805 may include various sensors (e.g., cameras, microphones, LIDAR, GPS, accelerometers, door sensors, light sensors, proximity sensors, thermal sensors, tilt sensors, hydraulic pressure sensors, brake caliper sensors, etc.). The autonomous driving unit may include one or more autonomous driving computer systems for computing control inputs to the vehicle-level components (e.g., engine, braking system, steering, etc.).

The vehicle control interface 810 allows the sensor information to be provided to the various vehicle-level components 815. For example, a command/output from the AD computer system may be used to actuate two or more components (e.g., steering, and/or brake) at the vehicle level. According to aspects of the present disclosure, handling braking failure(s) may be implemented using sensors, the braking system at the vehicle level, and one or more computing systems.

In one or more embodiments, the vehicle-level elements may include propulsion-related components (or elements), gear/transmission-related components, steering, braking, interfacing, chassis/body, and other elements (e.g., tire pressure sensors and controls). While these vehicle-level components are depicted as being connected or communicatively connected via a single connection, there may be one or more redundant connections; there may also be differently configured connections (i.e., certain components may be on different connection segments than other components).

In one or more embodiments, the braking system includes a primary braking system (PBS) and a secondary braking system (SBS) as a backup system for the primary braking system. For example, the ADV may decelerate using the PBS by implementing a brake torque request method executing a rate of deceleration and/or to hold the vehicle at a standstill/park position. In response to detecting a malfunction of one braking system, the ADV may utilize one or more other braking systems. The vehicle-level components may include various sensors for providing feedback to the respective operations.

Figure 9:
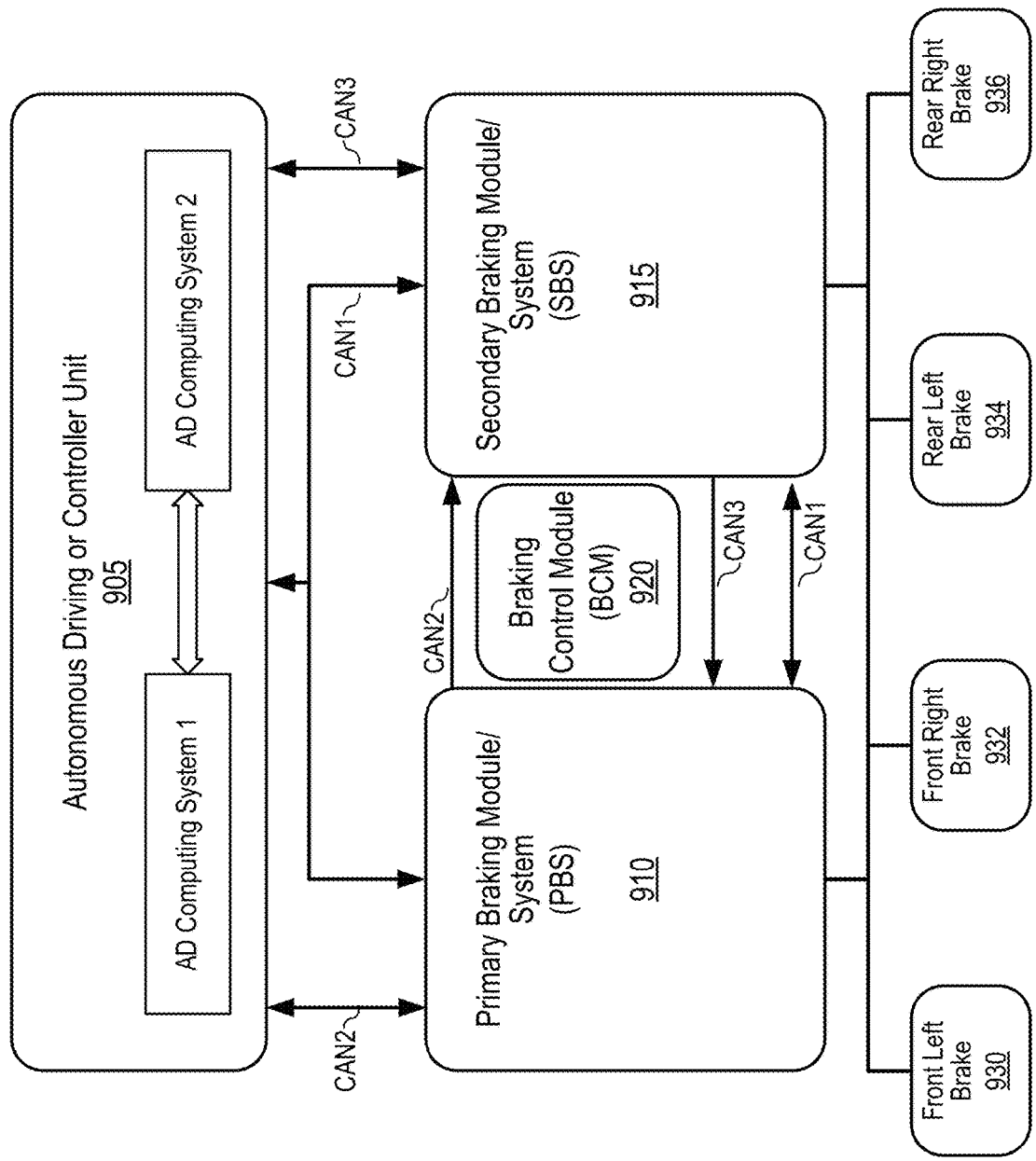
FIG. 9 depicts a block diagram of an alternative example control system, in accordance with aspects of the present disclosure.

FIG. 9 depicts a diagram of an alternative example control system and at least some of the associated braking systems, accordance to embodiments of the present disclosure. As shown, the control system 905 (which may be implemented as, in, or with system 110, control system 111, control module 306, or ADU 805) is communicatively coupled via one or more controller area networks (CAN) to a primary braking module or system 910 and a secondary braking module or system 915. It shall be noted that having more than one network interface for a braking module provides redundancy in case one of the CANs is down or faulty.

One or more of the braking systems may include integrated power brake (IPB), integrated brake control (IBC), and electronic stability control (ESC).

As illustrated, the various braking systems (e.g., PBS 910 and SBS 915) are functionally coupled with the brakes (e.g., brakes 930, 932, 934, and 936).

A braking control module 920 may interface between the various braking systems to facilitate communication and control between and among the braking systems. While not depicted, the braking control module may also interface with an EPB.

In one or more embodiments, the BCM 920 may monitor one or more conditions related to the braking systems to track failures, as explained in more detail below. The BCM 920 may generate failure messages for the control system 905 to record or log occurrences of various faults; alternatively, or additionally, the BCM 920 may directly log the occurrences. Depending upon the embodiment, the braking failure metric may be computed, using the logged information, by the BCM 920, by the control unit 905, or both.

Figure 10:
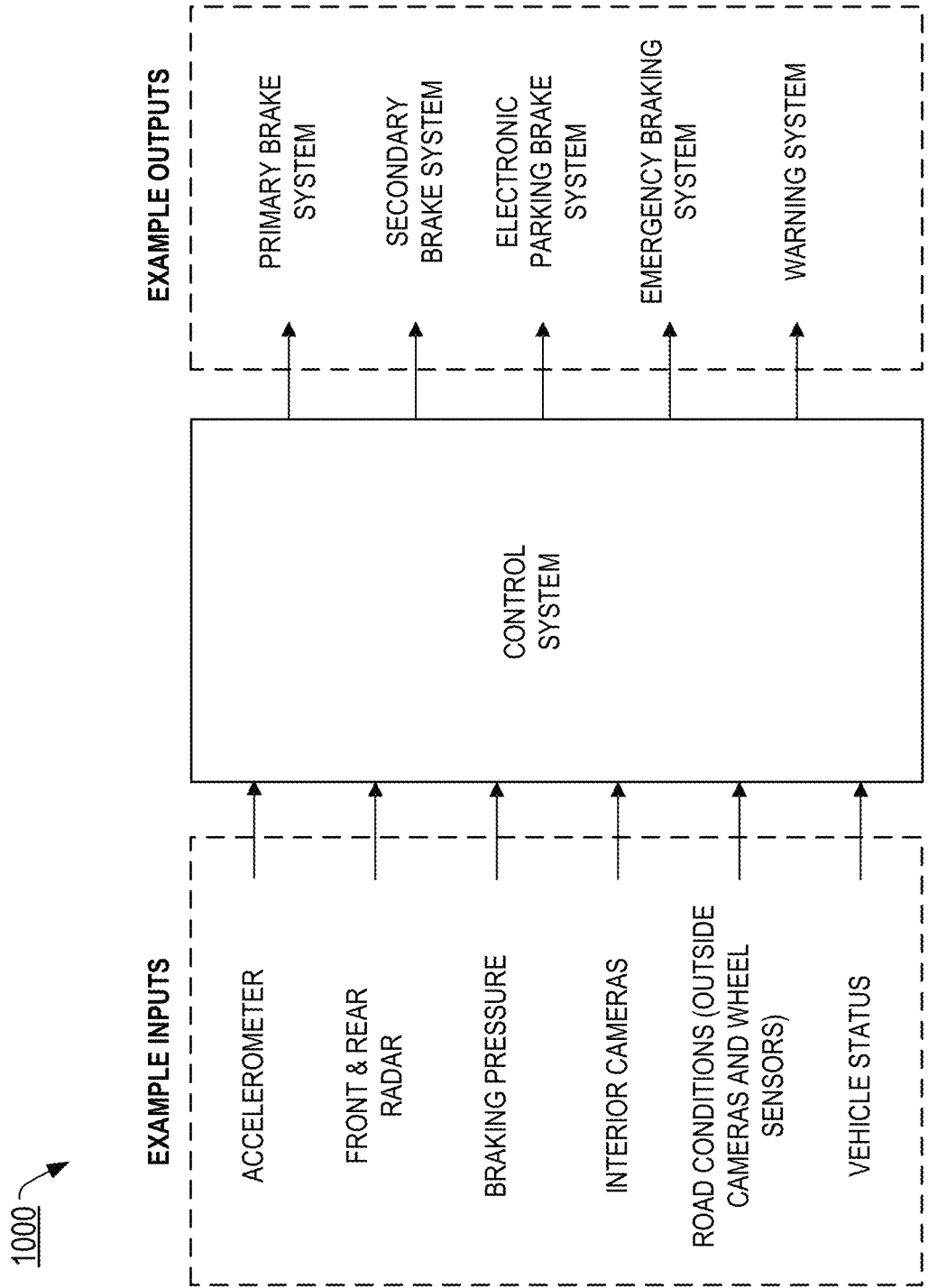
FIG. 10 depicts a diagram of an example control system and associated inputs and outputs, according to embodiments of the present disclosure.

FIG. 10 depicts a diagram 1000 of an example control system and associated inputs and outputs, according to embodiments of the present disclosure. As shown, the control system may use various measurements or sensor feedback as input. The example inputs may include information (e.g., speed) from one or more accelerometers, braking pressure values, hydraulic pressure, brake caliber values, radar (or LIDAR) information of the front and rear of the ADV, imaging information from interior cameras, road conditions captured by exterior cameras and/or wheel sensors, door sensors, vehicle status (e.g., speed, operation conditions of various systems, such as whether one or more of the braking systems are operating properly, etc.). While not depicted, in one or more embodiments, the control system may receive one or more failure messages related to braking, which it may use to monitor and control braking and vehicle safety.

Upon determining a status based upon one or more sensor inputs or messages, the control system may provide various outputs to various systems of the ADV. For example, outputs may include control signals to one or more of: the braking control module, the primary brake system, the secondary brake system, an emergency braking system, and warning systems, among others, for robust braking handling of the vehicle as disclosed in the current patent document.

In one or more embodiments, one or more wheel sensors may be used to detect speed of the ADV. The wheel sensors may generate magnetic pulses in the form of waves, proportional to the speed of the ADV. For example, one or more of the ADV's wheel sensors, which may be located at each of the wheels (i.e., front left (FL), front right (FR), rear left (RL), rear right (RR) wheel), may be used to detect the speed of the ADV based on pulses detected. In one or more embodiments, when at least two diagonal wheel sensors (e.g., FL & RR or FR & RL) detect pulses within a set time period, the control system may register a status or state of the ADV. The ADV may be in different states based on the speed of the ADV, and different control techniques may be applied accordingly.

Different actions (such as different brakes, braking rates, messages, or other actions) may be activated or triggered based on different states of the ADV. For example, depending upon the specific state, one or more braking systems may be engaged. Also, depending upon the specific state, a particular braking profile (e.g., rate of pressure to be applied or rate of deceleration) may be applied to a braking system. It shall be noted that, for a state, different braking systems may have different braking profiles applied to them.

Note that some or all components as shown and described above may be implemented in software, hardware, or a combination thereof. For example, such components can be implemented as software installed and stored in a persistent storage device, which can be loaded and executed in memory by a processor (not shown) to carry out the processes or operations described throughout this application. Alternatively, such components can be implemented as executable code programmed or embedded into dedicated hardware such as an integrated circuit (e.g., an application-specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of methods and symbolic representations of operations on data bits within a computer memory. These descriptions and representations are the ways used by those skilled in the data processing arts to most effectively convey the substance of their work to others skilled in the art. A method may, generally, be conceived to be a self-consistent sequence of operations leading to a desired result or results; the operations may be considered to be those requiring physical manipulations of physical quantities.

It should be borne in mind, however, that these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 11:
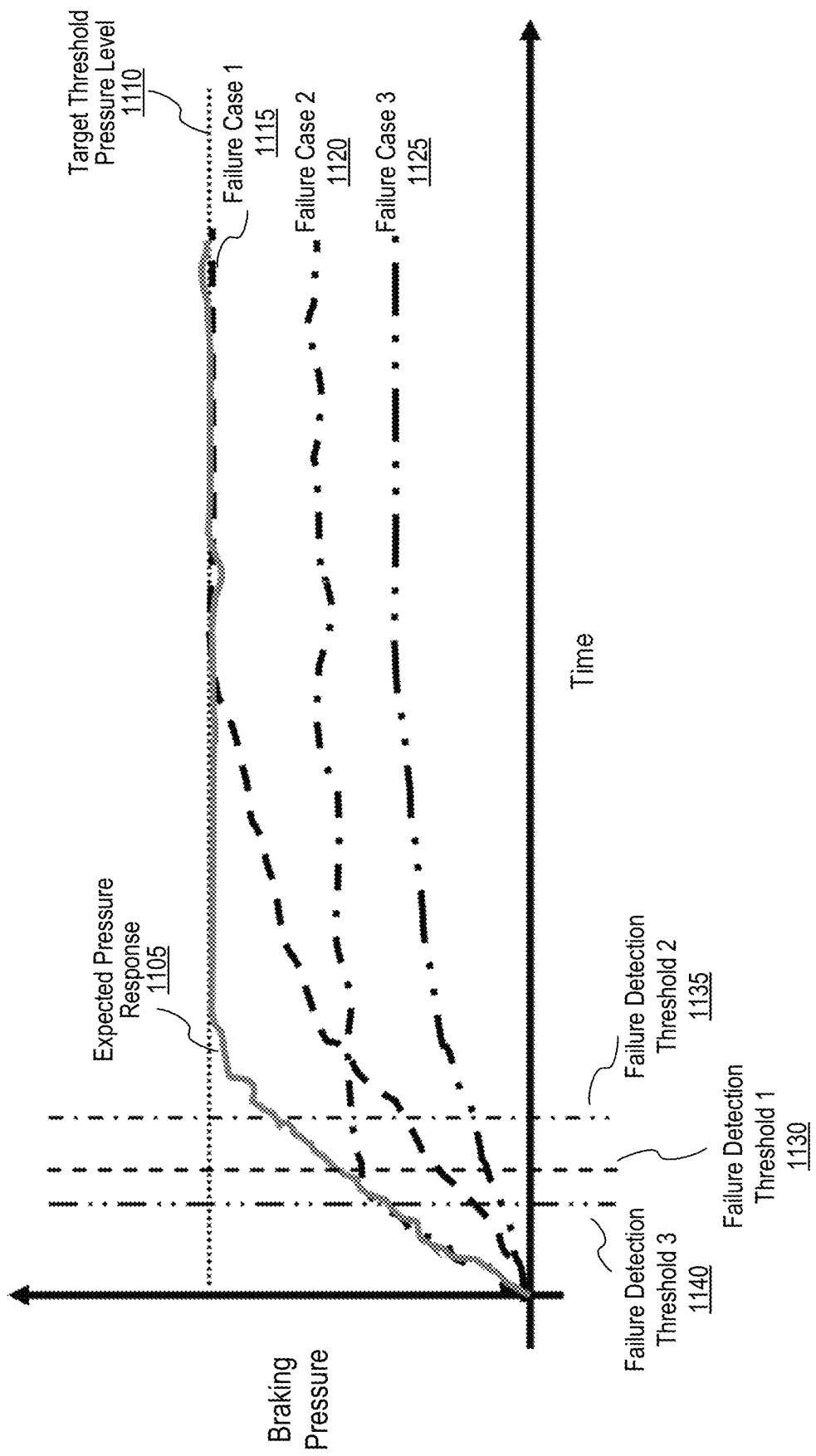
FIG. 11 depicts braking profiles, according to embodiments of the present disclosure.

It shall be noted that one or more different conditions may be monitored and/or may be combined to form a detected braking failure. For example, a preferred or determined braking profile may have one or more key features set as thresholds to gauge success or failure of a braking system or systems. Consider, by way of example, the braking profiles depicted in FIG. 11. An expected or preferred pressure response profile is depicted as curve 1105. To safely and smoothly brake, the braking pressure should ramp at a certain rate or according to a certain profile to a target pressure level 1110 within a certain amount of time. For example, in failure case 1 (1115), even if the braking pressure eventually reaches the target pressure level 1110, if it fails to ramp according to the profile (e.g., it does not reach a certain pressure threshold within a certain time, as noted by failure detection threshold 1 (1130)), it may be registered as a failure. A corresponding failure message may be generated, which may include information, such as the time of failure, system(s) involved, and type of failure. In one or more embodiments, each type of failure may have an associated severity level (i.e., a severity weight) associated with it. Failure case 2 (1120) represents a failure condition in which the braking system was initially ramping according to the profile but at some point (e.g., failure detection threshold 2 (1135)) deviated and failed to achieve the threshold level 1110. Finally, failure case 3 (1130) represents a failure condition in which the brake pressure is detected (e.g., failure detection threshold 3) as both failing to ramp quickly enough and failing to reach a sufficient pressure level. These failures are provided by way of example only.

One skilled in the art shall recognize that any of a number of conditions may be monitored and any number of different conditions may be formed into a rule for a failure message or occurrence to be detected and recorded. The following chart or log is an example of failures with different levels of severity:

| | Conditions/Status | Number of Occurrences | Severity Weight |
|---|---|---|---|
| L1 failure | e.g., signal communication failing—no signal or some signals failure within a short time (10-50 ms) but recovered; etc. | | e.g., 1 |
| L2 failure | e.g., pressure failure (e.g., failure to achieve a first pressure level by a first threshold time; such as only able to build to 50% of a maximum requested pressure); longer-time (50-100 ms) signal communication failure; etc. | | e.g., 2 |
| L3 failure | e.g., pressure building time > 1.5 × anticipated time but can reach the request pressure; etc. | | e.g., 3 |
| L4 failure | e.g., pressure building time > 2 × anticipated time but still can reach the requested pressure; two brake channels have a failure issue; etc. | | e.g., 4 |
| ... | ... | | ... |
| Ln failure | e.g., hardware fatal error (e.g., motor stuck); no voltage available for a braking system; failure period of a prior status > a threshold (e.g., 3 seconds); etc. | | e.g., 10 |

It shall be noted that the rules that relate conditions to a failure occurrence with a corresponding severity may be simple or complex, may be combined to form new rules and may have any number of conditions.

In one or more embodiments, the log may comprise tracking in which braking system failures were detected (e.g., PBS, SBS, EPB, etc.). For example, a table or log may be generated that indicates type of failure, system that experienced the failure, and number of occurrences:

| Failure type | PBS | SBS | ... | Braking system m |
|---|---|---|---|---|
| L1 failure | # of occurrences | # of occurrences | ... | # of occurrences |
| L2 failure | # of occurrences | # of occurrences | ... | # of occurrences |
| L3 failure | # of occurrences | # of occurrences | ... | # of occurrences |
| L4 failure | # of occurrences | # of occurrences | ... | # of occurrences |
| Ln failure | # of occurrences | # of occurrences | ... | # of occurrences |
| | # of occurrences | # of occurrences | ... | # of occurrences |

Furthermore, the braking systems may share some or all of the failure rules, may have their own set of failure rules, or a combination thereof. For example, PBS may have its own set of failure rules; none, some, or all of which may be shared with another braking system (e.g., SBS).

Also, in one or more embodiments, during a time period (e.g., a request cycle for a braking event), if multiple failures occur in which a lesser failure is included within a more severe failure, the worst failure (i.e., the one with the highest severity level) to occur in a defined period may be the only one that is recorded. Alternatively, all failures may be recorded. In yet other alternative embodiments, all failures may be recorded, but the lesser-included failure occurrences may be excluded from the braking failure metric calculation.

Figure 12:
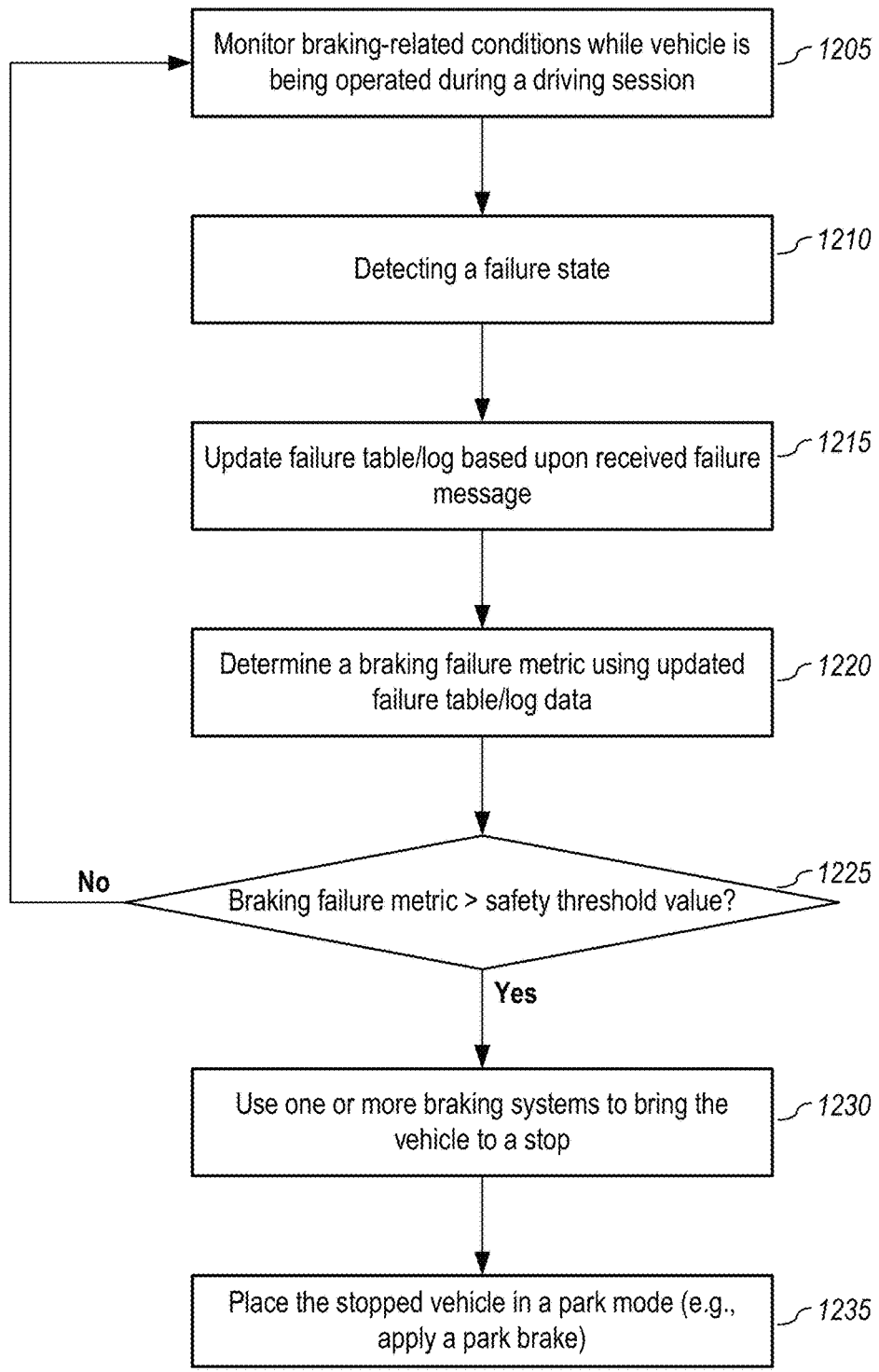
FIG. 12 depicts a method for operating an autonomous vehicle while handling braking-related failure occurrences, according to embodiments of the present disclosure.

FIG. 12 depicts a method 1200 for operating an autonomous vehicle while handling braking-related failure occurrences, according to embodiments of the present disclosure. While the vehicle is being operated for a driving session, a controller may monitor (1205), using one or more sensors, one or more conditions related to braking of the vehicle. Given data from the monitored conditions, a failure state related to braking that occurred during operation of the vehicle may be detected (1210). In one or more embodiments, the failure state may be one failure state from a set of one or more failure states, in which each failure state has a severity level associated with it. In one or more embodiments, the detection of a failure state may be performed by the AD controller unit, by a braking module, by another component, or by a combination thereof.

Also, the detection of a failure state by a unit or module may cause a failure message to be generated and sent to a module or unit that logs the failure states. Thus, given a detected failure state, a failure log may be updated (1215) based upon the detected failure state. The failure log may be reset at the commencement of each new vehicle operation session or may carryover from one or more prior sessions. In one or more embodiments, the log may be reset according to a set of one or more criteria, such as being reset after a certain time period (e.g., the beginning of every day).

Given the updated failure log, a braking failure metric (or braking safety metric) may be computed or determined (1220) using the updated failure log. In one or more embodiments, the braking failure metric may be determined in one or more ways. The braking failure metric may be computed according to a formula that utilizes the number of occurrences and the severity levels. For example, the braking failure metric may be computed as follows:

$$\text{Braking Failure Metric} = \prod_i^{brake\_system\_m} \left( \sum_j^{failure_{state_n}} \text{Severity}_{ij} \text{Occur}_{ij} \right)$$

where:
the number of braking systems considered is i=1 to m,
the number of failure states or conditions considered is j=1 to n, Severity$_{ij}$ represents the severity factor of the jth failure state or condition for the ith braking system; and Occur$_{ij}$ represents the number of occurrences of the jth failure state or condition for the ith braking system.

In one or more embodiments, when computing the braking failure metric, if a braking system does not have a corresponding rule, the severity factor may be set to zero for that rule for that braking system.

In one or more embodiments, by way of illustration, assuming only the PBS and the SBS were considered, the braking failure metric may be determined as follows:

$$\text{Braking Failure Metric} = \sum_{j=1}^{failure\_state_n} \text{Severity}_{PBS\_j} \text{Occur}_{PBS\_j} *$$
$$\sum_{j=1}^{failure\_state_n} \text{Severity}_{SBS\_j} \text{Occur}_{SBS\_j}$$

where:

the number of failure states or conditions considered is j=1 to n,

Severity$_{PBS\_j}$ represents the severity factor of the jth failure state or condition for the PBS;

Severity$_{SBS\_j}$ represents the severity factor of the jth failure state or condition for the SBS;

Occur$_{PBS\_j}$ represents the number of occurrences of the jth failure state or condition for the PBS; and Occur$_{SBS\_j}$ represents the number of occurrences of the jth failure state or condition for the SBS.

Alternatively, the braking failure metric may use a look-up table or chart based upon data in log(s)/table(s). In yet other alternative embodiments, a neural network model or other type of machine learning model (e.g., a regression model) may receive input data from the log(s)/table(s) (e.g., number of each type of occurrence for each braking system) and output a braking failure metric.

Responsive to the braking failure metric meeting (1225) a safety threshold limit condition, the ADV may continue to operate and continue (1205) to monitor one or more conditions related to braking of the vehicle. While not depicted in FIG. 12, in one or more embodiments, depending upon the braking failure metric, the AD controller may take different actions. That is, there may be a set of one or more rules related to the braking failure metric that correlates an action or actions to braking failure metric (e.g., place one or more restrictions upon operation of the ADV). For example, if the braking failure metric has a value that falls within a certain range, the ADV may have its top speed limited, may have its range limited, may cause alerts to be triggered or sent, etc., or a combination of actions.

In one or more embodiments, responsive to the braking failure metric not meeting a safety threshold limit condition, the AD control unit may deem the ADV to be unsafe to continue to operate and will cause (1230) one or more braking systems of the vehicle to bring the vehicle to a stop. The braking system used to stop the vehicle may depend upon which braking system has or is experiencing a failure, which the AD control unit may consider when determining how to stop the ADV. Once stopped, the AD control unit may put (1235) the vehicle into a park mode (e.g., apply a parking brake).

Figure 13:
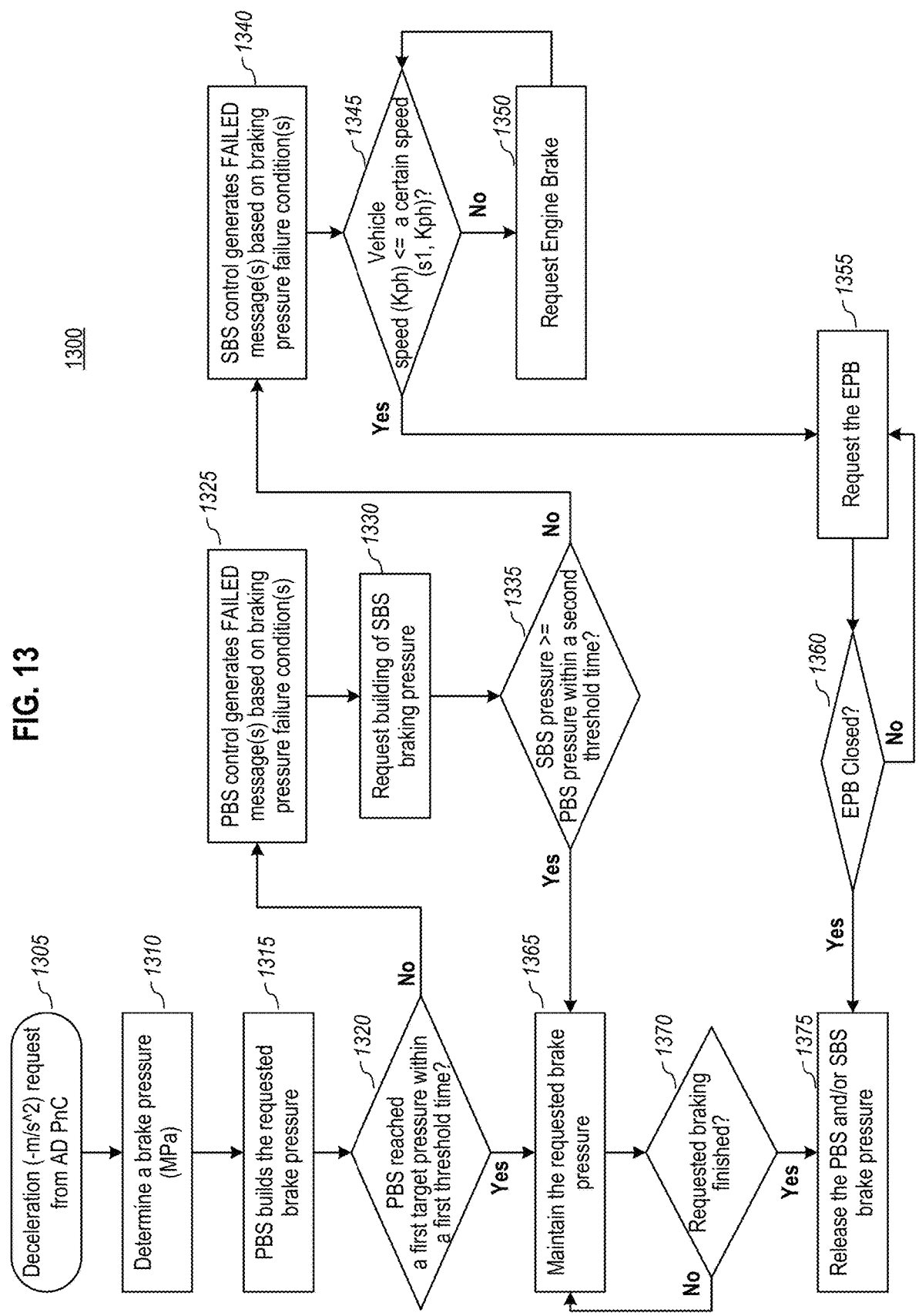
FIG. 13 depicts a methodology of monitoring braking conditions, according to embodiments of the present disclosure.

FIG. 13 depicts a methodology of monitoring braking conditions, according to embodiments of the present disclosure. In one or more embodiments, responsive to a deceleration request (1305) from the AD's planning and control units (PnC), a brake pressure value is determined (1310), and braking pressure is applied (1315) to one or more wheels of the vehicle via a primary braking system (PBS).

Based upon detecting one or more conditions of the vehicle or the PBS, a determination is made whether a failure state from a set of one or more failure states exists (1320). For example, a determination may be made (1320) if the PBS has reached a first target braking pressure within a first threshold time.

In one or more embodiments, if no failure related to the PBS is detected, the PBS may continue (1365) to maintain the requested braking pressure until it has been determined (1370) that the requested braking has been completed. Once the braking request has been successfully completed, the PBS may be released (1375).

Responsive to the PBS failing to achieve the first target braking pressure within the request threshold time, braking pressure may be applied (1330) to one or more wheels of the vehicle via a second braking system (SBS), and the failure log may be updated (1325) with an indicator corresponding to the detected PBS failure state. In one or more embodiments, updating the log may result from receipt of a message that is generated (1325) as result of the detected failure state. The message may comprise an identifier of the braking system involved (e.g., PBS), the type of failure (e.g., failing to achieve a threshold level of braking pressure within a set time), and a time at which the failure occurred. Of course, the message may contain fewer or more pieces of data.

In one or more embodiments, monitoring of the braking operation continues (1335), and a determination may be made if the PBS, SBS, or both are experiencing any failures. For example, one failure rule may comprise determining whether the SBS pressure has reached an appropriate level (e.g., is the SBS braking pressure greater than or equal to the PBS braking pressure within a second threshold of time?). In one or more embodiments, if sufficient braking pressure is being generated and applied to the vehicle, the braking pressure is continued (1365) until it has been determined (1370) that the requested braking has been completed. Once the braking request has been successfully completed, the PBS, SBS, or both may be released (1375).

However, if the SBS also experiences a braking failure (1335), braking pressure may be applied to one or more wheels of the vehicle via one or more additional braking systems, and the failure log may be updated (1340) with an indicator corresponding to the detected SBS failure state. In one or more embodiments, updating the log may result in a message being generated (1340) because of the detected failure state. The message may comprise an identifier of the braking system involved (e.g., SBS), the type of failure, and time at which the failure occurred, although fewer or more pieces of information may be included in the message.

In one or more embodiments, depending upon the braking systems available to the AD PnC and the extent of the failures, engine braking may be the primary or only means available to slow the vehicle. Engine braking (and, if available, other braking) may be applied (1350) until a speed condition is reached (1345) (e.g., the vehicle is slowed to below a certain speed). Once that speed condition has been reached, the EPB may be requested (1355). The EPB may be monitored and the EPB may continue to be applied until it has been determined that the braking calibers of the EPB have successfully closed (1360). Once the EPB has successfully engaged, the PBS, SBS, or both (if present) may be released (1375).

It shall be noted that throughout this process, the maintained log(s) may be used to gauge the braking failure metric using the updated failure log(s) by computing the braking failure metric based upon a combination of the occurrences of failure states weighted by their associated severity factors. Thus, each of the actions taken above as a result of detecting a failure may be considered to be as a result of braking failure metric having a value that triggers an action or actions. Alternatively, or additionally, the ADV may have a generalized methodology for handling typical failures (e.g., a methodology the same as or akin to that depicted in FIG. 13) but may interrupt that methodology if the braking failure metric triggers an overriding action, such as parking the vehicle due to safety concerns. Note that the log(s) may be reset, and the logged occurrences represent the occurrences for a certain time period, such as an operational time period (e.g., a driving session).

In one or more embodiments, the messages may, in addition to causing updates to the log, may also be used to trigger one or more warning signals or warning/failure signals to a user, passenger, and/or remote user. Such warnings may comprise one or more media types (e.g., lights, sounds, messages, etc.). For example, a message may include a light signal, a text message, an audible signal, a tactile signal, a network message, an application message, an email, or any combination thereof. In one or more embodiments, the warning messages may be different based on different detected failures.

C. Embodiment for Robust Autonomous Parking

As noted above, while parking a vehicle may seem commonplace, it is rather complex due to the various rules and considerations involved-proper parking is essential for maintaining order, safety, and accessibility. It plays a critical role in ensuring the efficient use of space, reducing traffic congestion, and supporting safe conditions for the general community.

For example, parking a vehicle on a slope safely is of utmost importance, particularly for the autonomous vehicles. Given the significant public safety implications, besides specific policies and local regulations, there are several factors to consider especially when parking on a road with a slope.

1. Slope Determination Embodiments

FIGS. 14A-D provide some graphical depictions of guidelines for different parking conditions, according to embodiments of the present disclosure.

Figure 14D:
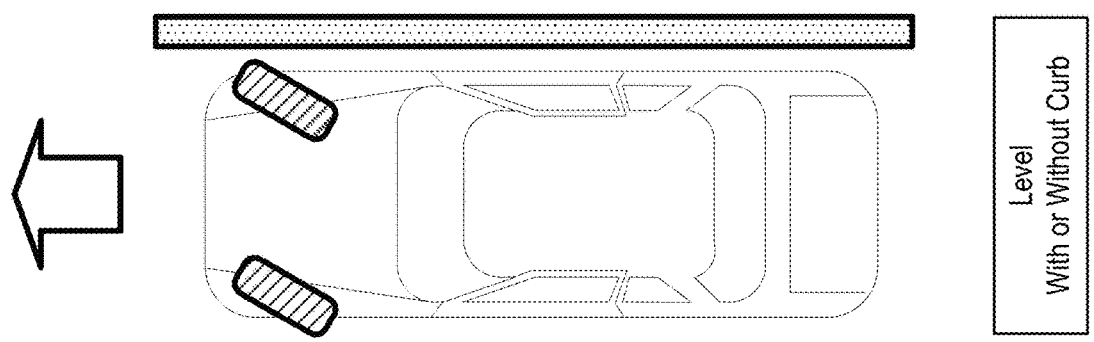
FIGS. 14A-D graphically illustrate different front wheel configurations for different road conditions, according to embodiments of the present disclosure.
Figure 14C:
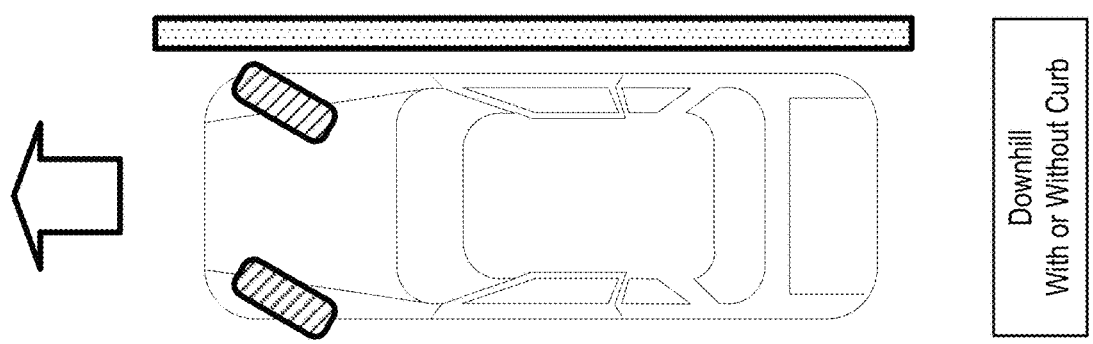
Figure 14B:
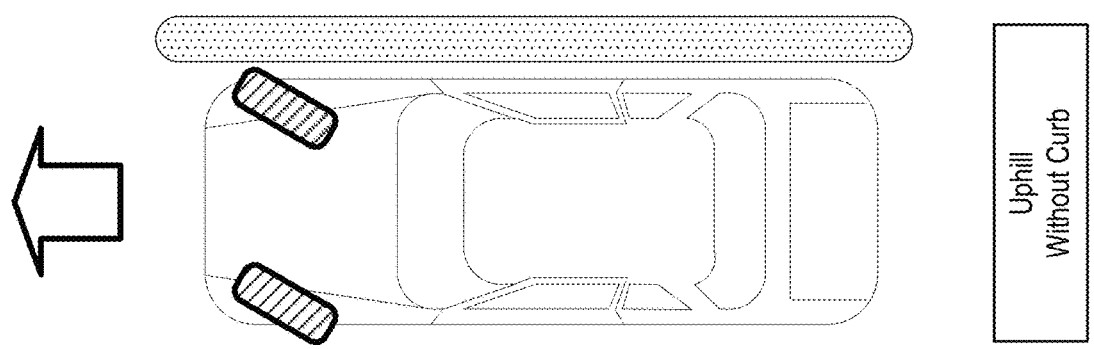
Figure 14A:
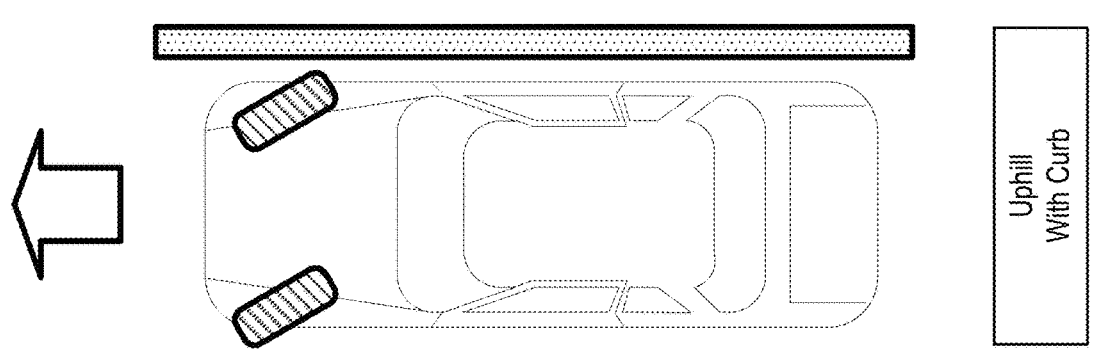

FIGS. 14A & 14B depict examples of uphill parking (i.e., the vehicle is facing uphill), according to embodiments of the present disclosure. FIG. 14A depicts a vehicle parking on an uphill sloped road with a curb, according to embodiments of the present disclosure. In such a setting, the front wheels of the vehicle should be turned away from the curb (i.e., toward the road). Preferably, the parking brake should be applied as a safety measure to prevent the vehicle from rolling backward. This configuration helps prevent the vehicle from rolling downhill if the brakes fail because the vehicle will roll into the curb and be stopped.

FIG. 14B depicts a vehicle parking on an uphill sloped road without a curb, according to embodiments of the present disclosure. Without a curb to brace the vehicle's wheels should the parking brake fail, the wheels should be turned to the right side of the road. That is, it shall be noted that the parking procedure is the same as in FIG. 14A except the wheel direction is opposite. The reason the wheels are turned in the opposite direction than in FIG. 14A is that, if the braking fails, the vehicle will roll off the road rather than roll toward the center of the road.

FIG. 14C depicts a vehicle parking on a downhill sloped road (with or without a curb), according to embodiments of the present disclosure. When a vehicle is parking on a sloped road with a curb and is facing downhill, the front wheels should be turned toward the curb. If the parking brake fails and the vehicle rolls, the front wheels will be blocked by the curb and prevent the vehicle from rolling very far. If the vehicle is parking facing downhill and there is no curb, the front wheels should be turned in the same direction as if a curb was present. If the vehicle rolls, it will roll away from the street rather than rolling into traffic. Note that whether or not a curb is present, the wheel direction is the same for downhill parking.

Finally, FIG. 14D illustrates the wheel configuration for parking on a level road, according to embodiments of the present disclosure. If parking on the right side of the street, the front wheels should be toward the curb or the shoulder of the road. These configurations help prevent the vehicle from rolling into traffic or the opposite lane.

While not depicted, for angle parking, generally, the front wheels should be straight, and the parking brake applied.

Currently, to the knowledge of the inventors of the current patent document, there are no distinct steering control methods specifically tailored for parking a vehicle, particularly on slopes. Rather, there tends to be just a fixed steering angle value that can be applied after parking. Therefore, the development of efficient and secure control methodologies for parking vehicles is important for the successful deployment of autonomous driving vehicles.

Note that for autonomous driving, the vehicle's controller should be aware of at least the road slope and whether a curb is present or not. Embodiments herein provide definitions from the slope status (e.g., positive slope, negative slope, or level ground), based on one or more inputs and curb status detected by one or more inputs (e.g., using LIDAR/camera sensor systems, and/or information from a high-definition (HD) map). In one or more embodiments, the wheel angle may be determined based upon a formula or defined table using input values such as gradient of the slope and vehicle weight (although other inputs may be used, such as road surface, raining, etc.). As noted below, embodiments may also account for unexpected results. For example, to ensure robust vehicle safety during parking, embodiments may discontinue steering the wheel toward the desired wheel angle if the wheel torque exceeds a predefined torque threshold. This approach enhances the overall reliability and safety of the parking process.

Figure 15:
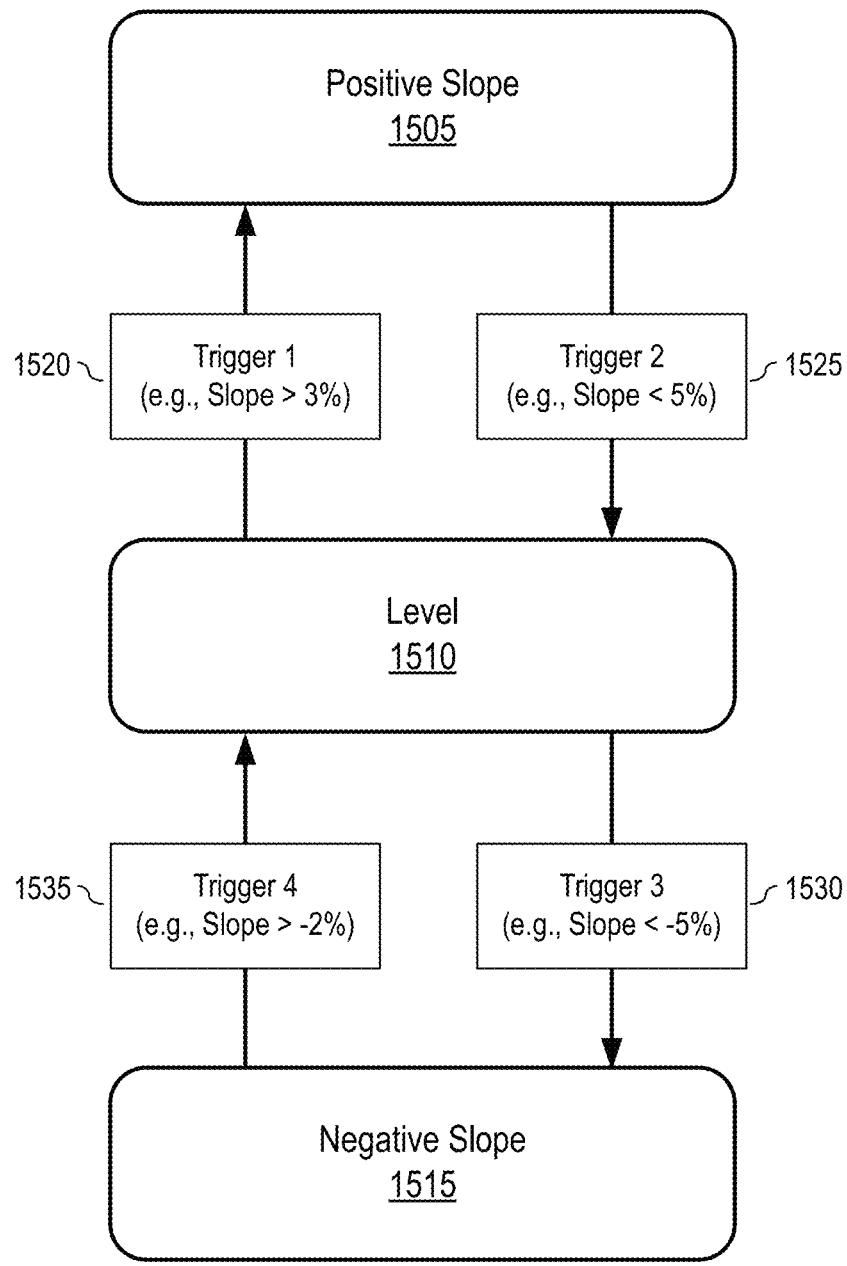
FIG. 15 depicts a state diagram for classifying slope conditions, according to embodiments of the present disclosure.

As a preliminary matter, the autonomous vehicle should determine the slope of the road. FIG. 15 depicts a state diagram/definition 1500 for classifying slope conditions, according to embodiments of the present disclosure. In one or more embodiments, the slope conditions for positive, negative, and level may be defined. For example, in one or more embodiments, as illustrated in FIG. 15, given a slope, if the slope is greater than a first value (e.g., 3% or greater gradient) 1520, the slope may be defined as a positive slope 1505 (i.e., uphill slope for the vehicle). If the slope is less than a second value (e.g., 5% or less gradient) 1525 but above a third value, the slope may be deemed as level 1510.

In one or more embodiments, as illustrated in FIG. 15, given a slope, if the slope is less than the third value 1530 (e.g., −5% or less gradient (i.e., a greater absolute value)), the slope may be defined as a negative slope (i.e., downhill slope for the vehicle). If the slope is greater than a fourth value (e.g., −2% gradient) 1535 but less than the first value, the slope may be deemed as level 1510.

In the depicted embodiment, there are some differentials between some of the values (e.g., between the first and second values and between the third and fourth values). These differentials are to account for noise and other signal control process practices. It shall be noted that the values and differentials (or whether any differentials should be present) are matters of implementation choice and may be selected differently and/or may be defined differently for different factors (such as vehicle weight, safety factors, braking systems, braking operational levels, etc.).

Figure 16:
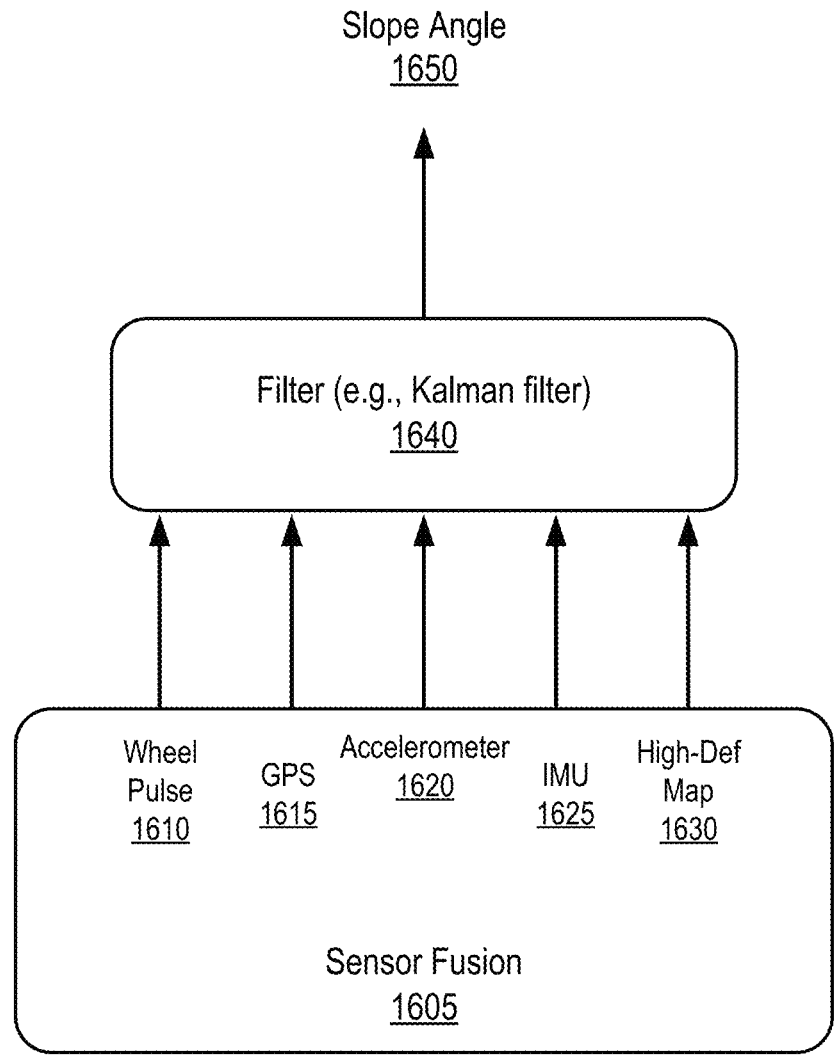
FIG. 16 depicts a system configuration for determining slope of a road, according to embodiments of the present disclosure.

An important input to the state determination 1500 is the slope or gradient. In one or more embodiments, the slope may be determined using one or more inputs, such as one or more inputs from one or more sensors. FIG. 16 depicts a subsystem of the autonomous controller system that may be used to obtain the slope, according to embodiments of the present disclosure.

FIG. 16 depicts a system configuration for determining slope, according to embodiments of the present disclosure. In one or more embodiments, one or more inputs may be used to determine the slope. For example, wheel pulses 1610 may be used as an input. Utilizing wheel pulse data, the vehicle's parameters, such as acceleration, speed, and standstill, may be ascertained by integrating with one or more sensors (e.g., a 6-axis movement sensor). This information may be leveraged to calculate the incline or slope of the terrain.

In one or more embodiments, GPS input 1615 and/or GPS input in conjunction with high-definition map 1630 (which may be stored in memory or access via wireless network connection) may be used to determine slope. For example, given GPS coordinates, the coordinates may be correlated to slope information of a high-definition map that includes slope/topological information.

In one or more embodiments, level sensors, such as accelerometers 1620 and/or an IMU 1625 in the vehicle, may be used to determine slope angle.

In one or more embodiments, one or more of the above-listed inputs may be as inputs to a sensor fusion module 1605 that may filter 1640 the inputs to obtain the final slope 1650 value. The fusion/filtering may include using a voting mechanism between the inputs, averaging the inputs, weighted averaging, or using more sophisticated filtering, such as a Kalman filter, linear quadratic estimation, etc.

One skilled in the art shall recognize that other inputs and other means may be employed to estimate the slope.

2. Curb/No Curb Determination Embodiments

As noted in the prior section, in addition to appreciating the slope on which the vehicle is being parked, for safe parking, whether a curb exists beside the vehicle when parking may also be determined.

In one or more embodiments, GPS coordination and high-definition map(s) may be used to determine whether a curb exists in similar manner as for determining slope. For example, given the position of the vehicle, a map with curb information may be accessed to determine whether that location has a curb.

In one or more embodiments, perception inputs may be used to ascertain whether a curb exists. For example, LIDAR and/or RADAR may be used to determine whether a curb is present. Additionally, or alternatively, one or more cameras may be used to collect images and one or more machine learning models may be used to classify whether a curb is present.

Figure 17:
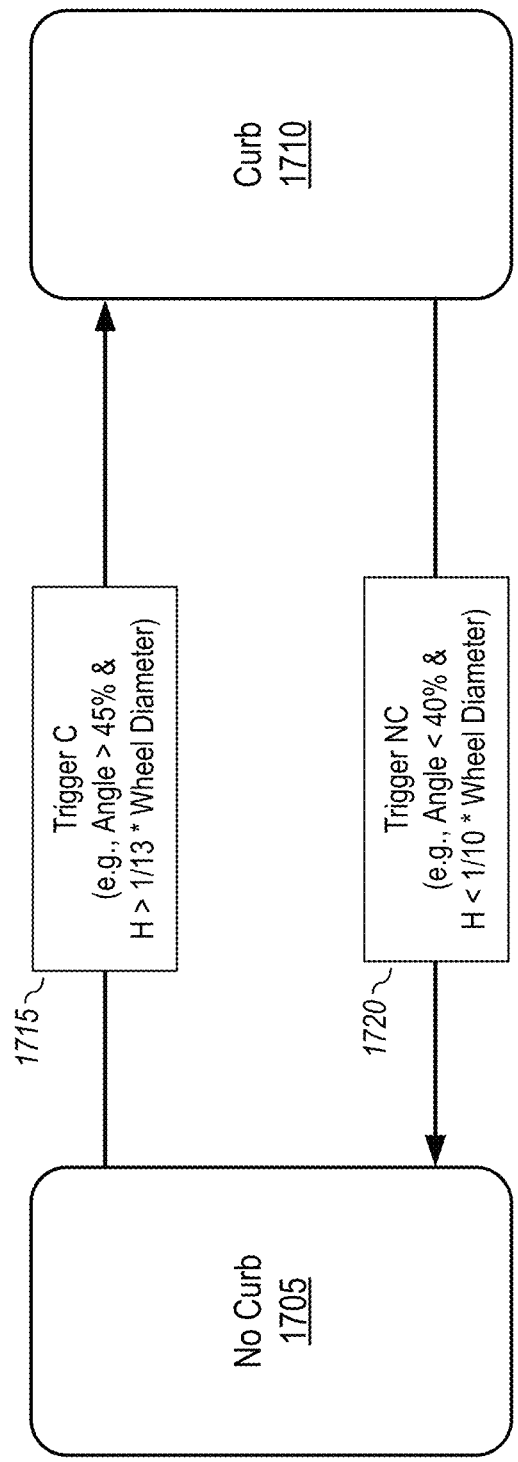
FIG. 17 depicts a state diagram for classifying curb conditions, according to embodiments of the present disclosure.
Figure 18:
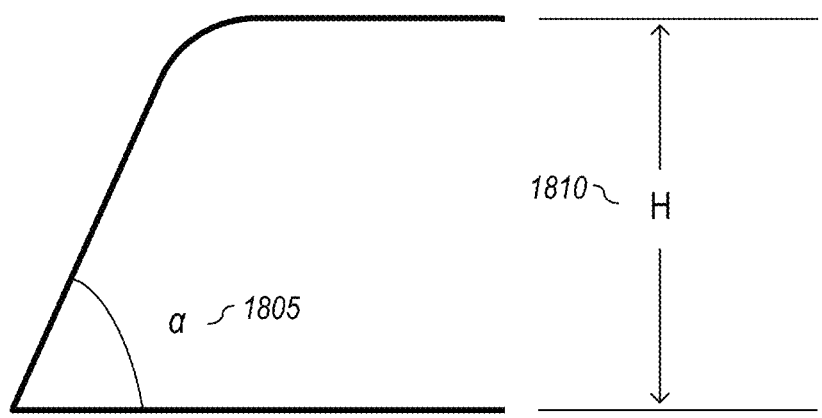
FIG. 18 graphically illustrates a curb and its related metrics, according to embodiments of the present disclosure.

In one or more embodiments, what defines a curb may be set. FIG. 17 depicts a state diagram/definition 1700 for classifying a curb, according to embodiments of the present disclosure. For example, given a detected image or images of curb conditions, a curb structure with an angle greater than 45° and a height greater than $1/13$ of the vehicle's wheel diameter may be defined 1715 as being a curb 1710. FIG. 18 graphically illustrates a curb structure 1800 and its related metrics of angle, $\alpha$ 1805, and height, H 1810, according to embodiments of the present disclosure. In one or more embodiments, a curb structure with an angle less than 40° and a height less than $1/10$ of the vehicle's wheel diameter may be defined 1720 as not being a curb 1705. One skilled in the art shall recognize that different and/or additional parameters, values, or conditions may be employed for defining a curb or not a curb.

3. Vehicle Status Embodiments

Figure 19:
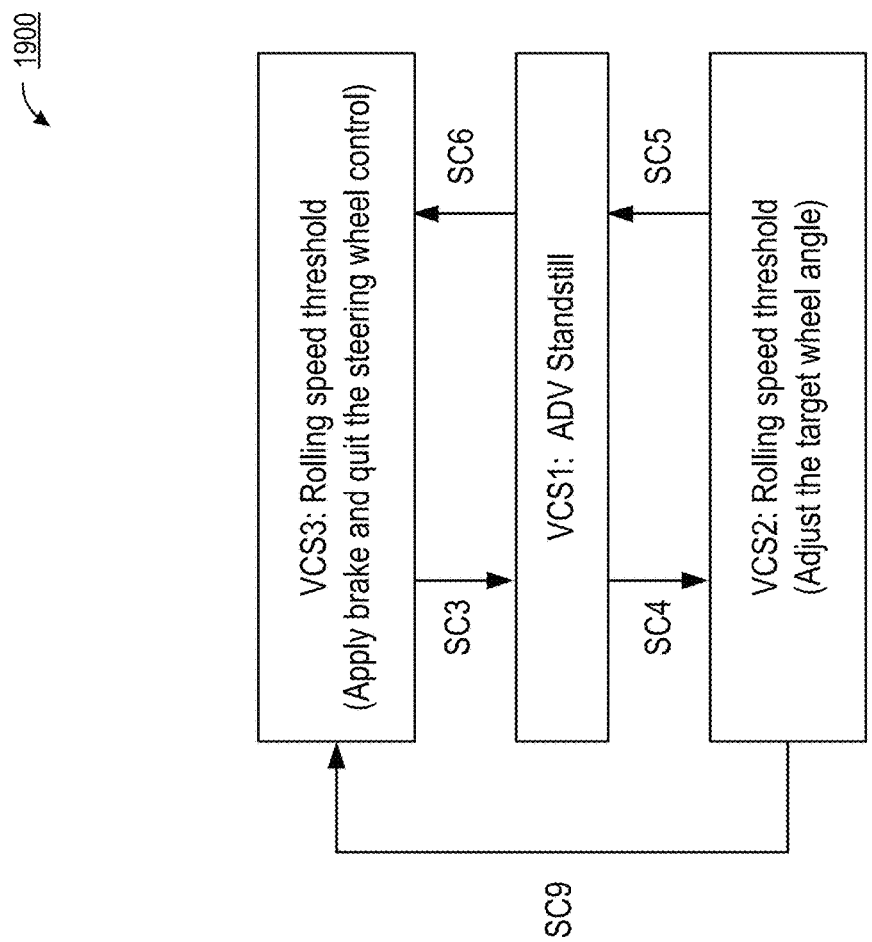
FIG. 19 depicts a state diagram for monitoring vehicle status, according to embodiments of the present disclosure.

In one or more embodiments, the autonomous controller may monitor status of the vehicle. FIG. 19 depicts a state diagram 1900 for vehicle status, according to embodiments of the present disclosure. Monitoring the state or status of the vehicle can be an important safety feature. For example, the vehicle should not attempt parking if its speed is too high.

In one or more embodiments, one or more wheel sensors may be used to detect a low speed or standstill of the vehicle. The wheel sensors may generate magnetic pulses in the form of waves, proportional to the speed of the autonomous vehicle. The vehicle may be in different states based upon its detected speed, and different control techniques or actions may be taken according to the state.

Referring to FIG. 19, the vehicle may be held to a standstill at a state VCS1. One or more of the vehicle's wheel sensors, which may be located at each of the wheels (i.e., front left (FL), front right (FR), rear left (RL), rear right (RR) wheel), may be used to detect the rolling speed of the vehicle based on pulses detected. In one or more embodiments, when at least two diagonal wheel sensors (e.g., FL & RR or FR & RL) detect pulses within a first time period, a trigger SC4, where "SC" stands for "status condition," may happen, in which the vehicle may change to the state VCS2, where "VCS" stands for "vehicle control state" or "vehicle condition status," in which the vehicle is rolling. For example, the first time period may be 250 milliseconds (ms) or another value. A trigger SC6 from the state VCS1 to a state VCS3 may not be allowed—i.e., the vehicle should not go from a standstill to a fast rolling speed.

While in the state VCS2, when no wheel sensors detect any pulses for a second period of time, a trigger SC5 may happen, in which the vehicle may change back to the state VCS1. However, when the rolling speed is larger than a first speed (e.g., 0.5 kph, 1 kph, or some other speed), a trigger SC9 may happen, in which the state of the vehicle may change to the state VCS3. For example, the second time period may be 50 ms, 150 ms, or another value.

Different actions may be activated or initiated based on different states of the vehicle. For example, for parking to occur, the vehicle may need to be in VSC1 or VSC2. If however, the vehicle achieves the state VSC3, the rolling speed of the vehicle is too high. Such a state may indicate that something has gone amiss (e.g., accelerator is providing too much, braking is failing at holding control, especially if the vehicle is on a sloped road). When the vehicle is at the state VSC3, the holding control (e.g., one or more braking systems) may be activated. If the vehicle is unable to reach the state VSC1 or VSC2 within a threshold time, the vehicle's controller may abort trying to park, may alert a user and/or administrator, may attempt to apply safety holding/braking control, and/or may take one or more actions.

4. Vehicle Parking Embodiments

Figure 20:
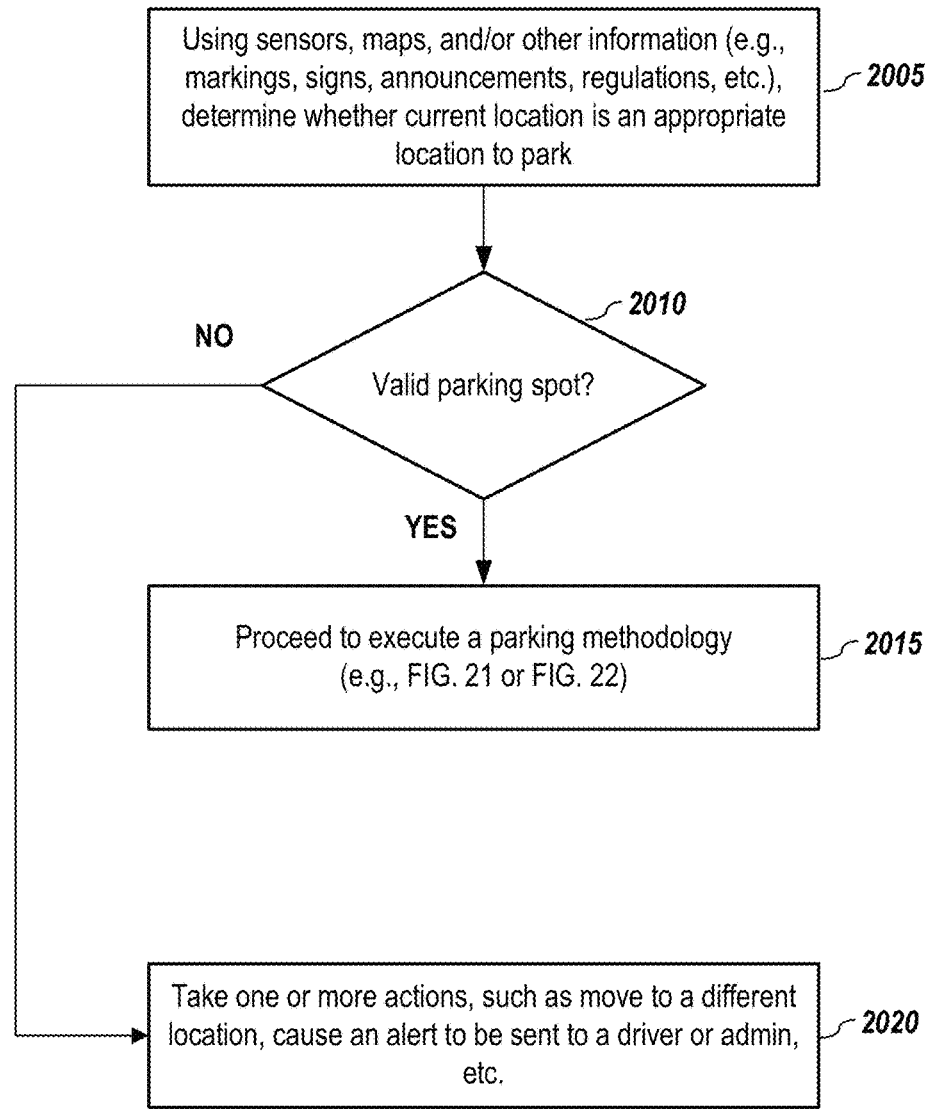
FIG. 20 depicts a methodology for initiating parking of an autonomous vehicle, according to embodiments of the present disclosure.

FIG. 20 depicts a methodology for initiating parking of an autonomous vehicle, according to embodiments of the present disclosure. In one or more embodiments, using one or more sensors, maps, and/or other information (e.g., markings, signs, announcements, regulations, etc.), the controller/autonomous driving system determines (2005) whether the current location is an appropriate location to park. For example, a camera may view a notice/sign and a machine learning method may be employed to detect text in the image(s). The sign may indicate when parking is allowed or if parking is prohibited. Also, in one or more embodiments, a camera may detect the color of a sign or curb to detect parking regulations (e.g., typically, no color may indicate that it is unrestricted parking, green may indicate limited time parking (e.g., 20 minutes), yellow may indicate very short-term parking (e.g., load and unloading only), red may indicate no parking or emergency vehicle parking only, and blue may indicate handicapped parking). In another example, GPS location information may be used to correlate the vehicle's location to parking conditions, or GPS coordinates may be sent to the vehicle to direct it to a parking location.

Responsive to determining (2010) that the vehicle's location is acceptable for parking, the controller/autonomous driving system may then proceed (2015) to execute a parking methodology. Example embodiments are depicted in FIG. 21 and FIG. 22.

Responsive to determining (2010) that the vehicle's location is not acceptable for parking, the controller/autonomous driving system may take (2020) one or more actions, such as move to a different location, cause an alert to be sent to a driver or admin, etc.

Figure 21:
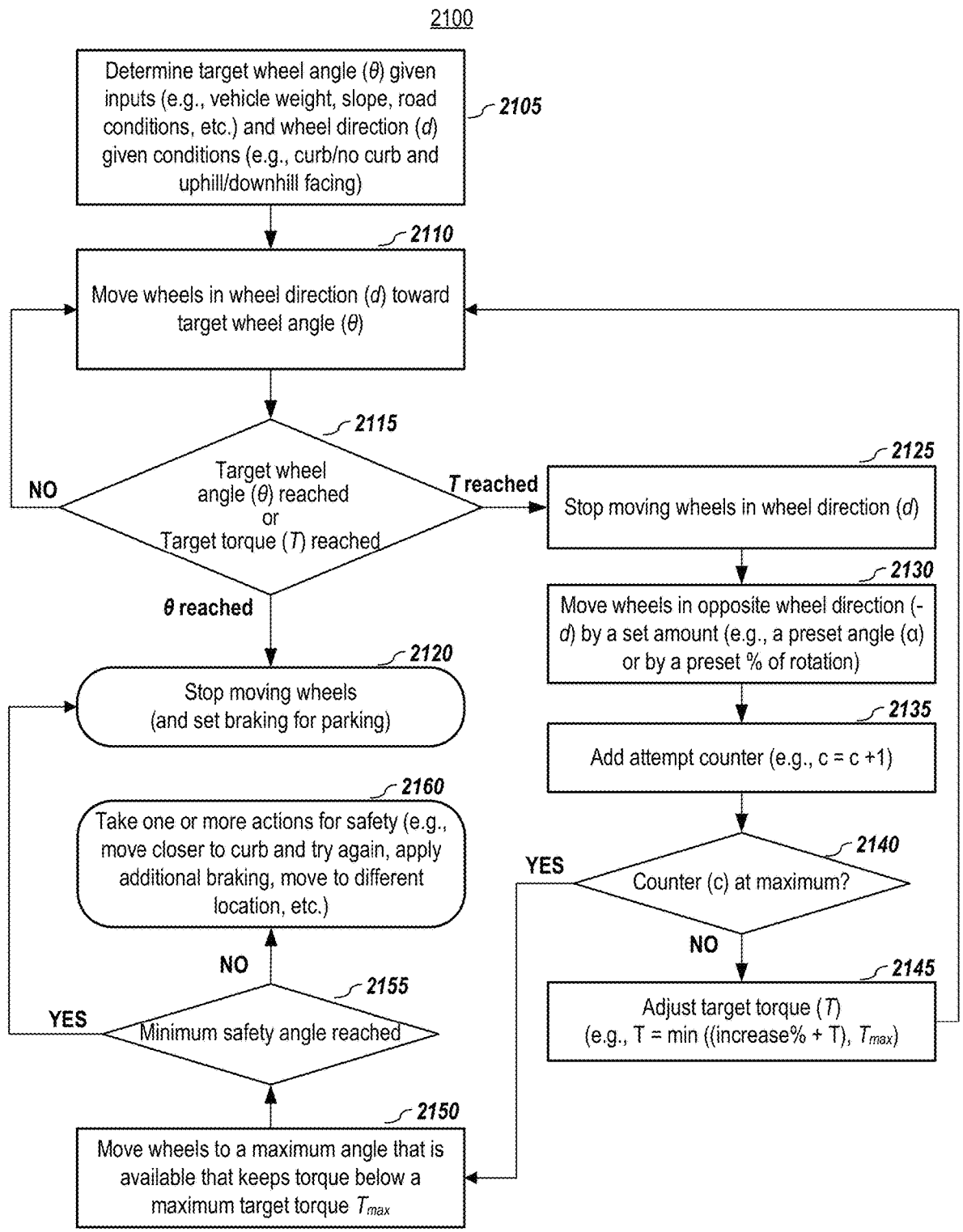
FIG. 21 depicts a methodology for parking of an autonomous vehicle, according to embodiments of the present disclosure.
Figure 22:
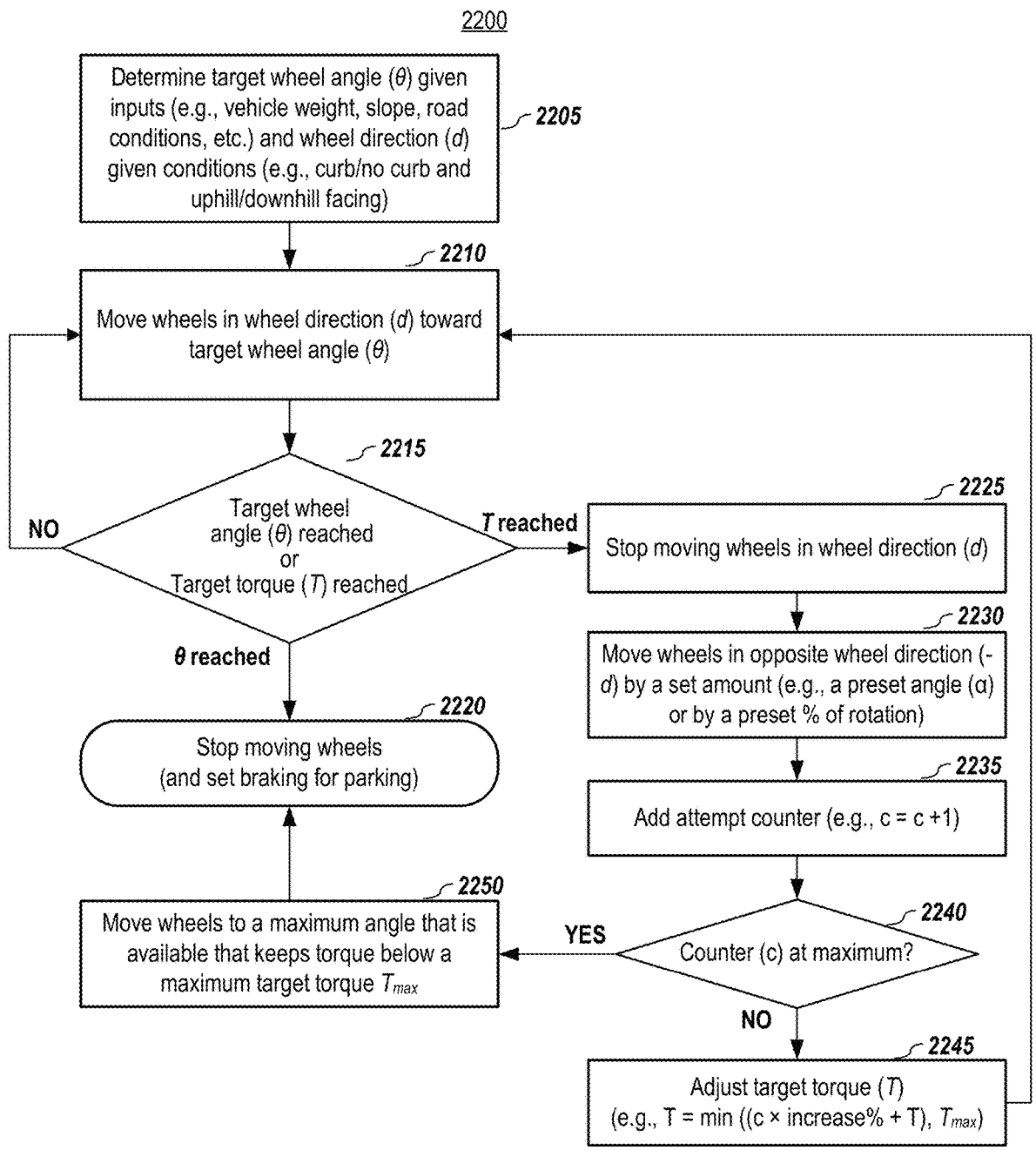
FIG. 22 depicts an alternative methodology for parking of an autonomous vehicle, according to embodiments of the present disclosure.

FIG. 21 depicts a methodology for parking of an autonomous vehicle, according to embodiments of the present disclosure. In one or more embodiments, the controller/autonomous driving system determines (2105) a target wheel angle (θ) using a set of inputs related to the vehicle. As noted above, the inputs may comprise slope of the road, weight of the vehicle, and/or other factors, such as uphill/downhill, curb/no curb, and road surface conditions (e.g., raining, gravel vs. pavement, etc.). In one or more embodiments, a table may be used, which takes as inputs at least the slope and vehicle weight and outputs a wheel angle for parking. In one or more embodiments, the controller/autonomous driving system also determines (2105) a wheel direction given road conditions obtained using one or more inputs. For example, whether the vehicle is parking on an uphill, downhill, or level surface and whether a curb is present may be considered in determining the front wheel direction, as discussed above.

The controller/autonomous driving system causes (2115) the front wheels of the vehicle to be moved in the wheel direction, seeking to achieve the target wheel angle. In one or more embodiments, while moving the front wheels, the controller monitors, using one or more sensors, the current wheel angle of at least one of the front wheels and torque of at least one of the front wheels.

Responsive to the front wheels of the vehicle reaching, with a threshold or tolerance level, the target wheel angle while maintaining a torque below a target torque level, the controller causes (2120) the front wheels of the vehicle to stop being moved in the wheel direction and causes one or more braking systems of the vehicle to be set for a parked mode. In one or more embodiments, the target torque value may be set as a value that is a percentage or amount below a safe torque value for the wheels.

Responsive to detecting that at least one of the front wheels of the vehicle has reached the target torque value (T) before the target wheel angle has been reached, the controller may cause (2125) the front wheels to be moved (2130) in an opposite direction to the wheel direction to relieve the torque pressure. In one or more embodiments, the wheels may be moved by a set amount based upon a preset angle, by a preset distance, or by a preset percentage of rotation.

In one or more embodiments, the controller may retry to achieve the target wheel angle, and this process may be repeated a number of times (e.g., 3 times but another number of times may be selected). To keep track of the number of tries, an attempt counter may be incremented (2135) each iteration. Responsive to a stop condition not being met (2140) (e.g., the counter is not at a maximum number of attempts), the process may return to iterate through attempting to have the front wheels of the vehicle to be moved in the wheel direction to the target wheel angle. In one or more embodiments, the target torque value may be adjusted (e.g., increased) (2145) in one or more of the iterations. For example, the target torque for the next iteration may be set or selected as the smaller of the maximum target torque ($T_{max}$) and an increased target torque that has been increased according to a table or formula. An example formula may be:

$$T = \min((\text{increase }\% + T_{current}), T_{max}),$$

where where, T is the target torque for the next iteration and is based upon a percentage increase (e.g., 10%) added to the current target torque but cannot exceed a maximum target torque ($T_{max}$).

Figure 23:
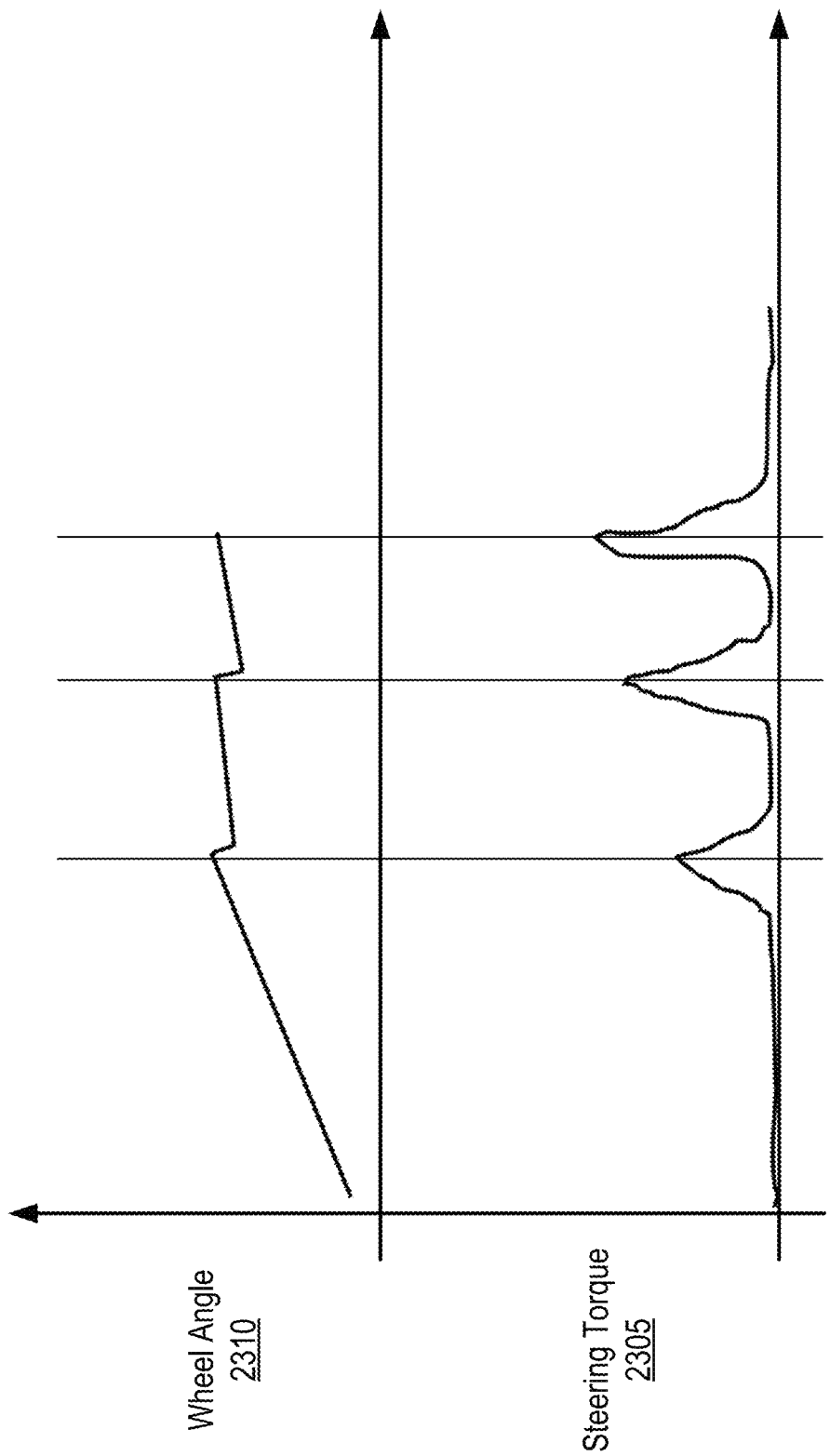
FIG. 23 graphically illustrates a robust approach for parking relative to wheel angle and front wheel (or steering) torque, according to embodiments of the present disclosure.

Such an approach creates robustness for embodiments. For example, an obstacle (e.g., a rock or some other object) may have prohibited the wheel from achieving the target wheel angle before causing the torque pressure to reach the target torque level. By moving the wheel and trying additional times with different torque values, the obstacle may be moved out of the way. FIG. 23 graphically illustrates a robust approach for parking relative to wheel angle and front wheel (or steering) torque, according to embodiments of the present disclosure. Note that is the depicted example of FIG. 23, three attempts were made with increasing steering torque each time. It shall be noted that similar robustness may be added by having the wheels moved to a particular alignment (e.g., straight) and then have the vehicle move forward and/or backward a small distance before retrying to achieve the target wheel angle.

Returning to FIG. 21, in one or more embodiments, responsive to the incremented counter having reached the counter limit, the controller may cause (2150) the front wheels to be moved with a range of a maximum angle that keeps the target torque below a maximum target torque. That is, if the target wheel angle cannot be achieved, the controller may move the wheel to maximum extent it can while keeping the wheel torque at an acceptable level. If that maximum wheel angle is within a minimum safe angle (2155) given the conditions (e.g., vehicle weight, slope angle, etc.), one or more braking systems of the vehicle to be set for a parked mode and the vehicle may be deemed parked.

However, responsive to the front wheels not achieving some minimum safe angle before the torque reaches a maximum, the controller may take (2160) one or more actions. For example, the controller may cause the vehicle to adjust itself relative to the curb and attempt parking again, may cause additional braking to be applied and still park, may alert a user or admin, and/or may cause the vehicle to move to a different location for parking.

FIG. 22 depicts an alternative methodology for parking of an autonomous vehicle, according to embodiments of the present disclosure. It shall be noted that the embodiment of FIG. 22 is similar to that of FIG. 21 however if the counter is reached, the controller moves (2250) the front wheels to a maximum angle that is available that keeps torque below a maximum target torque and then parks (2220) the vehicle. While not depicted in FIG. 22, another alternative may include alerting a user or admin and allowing them to decide whether to take some other action or allow the vehicle to park there under its current conditions. In such embodiments, the system may indicate a safety rating given the final wheel angle and conditions (slope, vehicle weight, road surface, etc.).

5. Additional Vehicle Parking Embodiments

It shall be noted that that during at least parts of the parking process and while parked, the controller may employ any of the methodologies for holding/braking a vehicle as disclosed above. For example, in response to determining, based upon data from one or more sensors, whether a failure state for braking from a set of one or more failure states has occurred, the controller may apply one or more additional braking systems.

It shall be noted that that during at least parts of the parking process and while parked, the controller may employ one or more additional safety check. For example, in one or more embodiments, one or more door sensors may be monitored to detect if a door is opened. When in autonomous driving mode, if an occupant opens a door while the vehicle is moving, the control system may lower the speed to stop and may park the vehicle (or not park it depending upon the control policy). If an occupant opens the doors when the vehicle is stationary, the control system may keep the vehicle from rolling and from brake system failures. Warning messages may be triggered for different stages/conditions. Embodiments for monitoring and handling doors are described in co-pending and commonly-owned U.S. patent application Ser. No. 18/319,432, filed on 17 May 2023, entitled "SYSTEMS AND METHODS FOR HANDLING AN OPEN DOOR OF A VEHICLE," and listing Baoping Yuan and Yaoming Shen as inventors, which patent document is incorporated by reference herein in its entirety and for all purposes.

D. Computing System Embodiment

In one or more embodiments, aspects of the present patent document may be directed to, may include, or may be implemented on or use one or more computing systems. An information handling system/computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a specialized processor-enabled computing system, a personal computer (e.g., laptop), tablet computer, mobile device (e.g., personal digital assistant (PDA), smartphone, phablet, tablet, etc.), smartwatch, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, read-only memory (ROM), and/or other types of memory. Additional components of the computing system may include one or more drives (e.g., hard disk drive, solid-state drive, or both), one or more network ports for communicating with external devices as well as various input and output (I/O) devices, such as a keyboard, mouse, touchscreen, stylus, microphone, camera, trackpad, display, etc. The computing system may also include one or more buses operable to transmit communications between the various hardware components.

Figure 24:
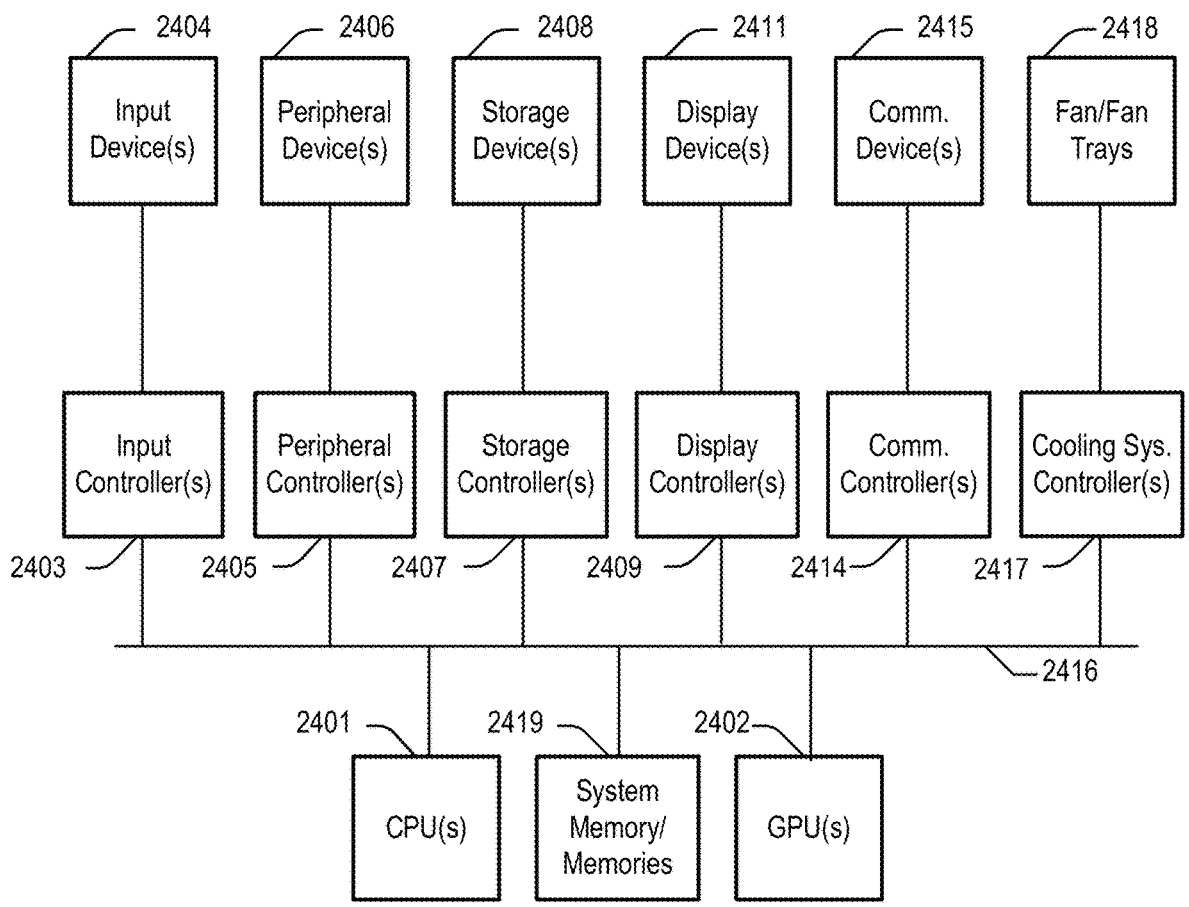
FIG. 24 depicts a simplified block diagram of a computing device, according to embodiments of the present disclosure.

FIG. 24 depicts a simplified block diagram of an information handling system (or computing system), according to embodiments of the present disclosure. It will be understood that the functionalities shown for system 2400 may operate to support various embodiments of a computing system—although it shall be understood that a computing system may be differently configured and include different components, including having fewer or more components as depicted in FIG. 24.

As illustrated in FIG. 24, the computing system 2400 includes one or more CPUs 2401 that provide computing resources and control the computer. CPU 2401 may be implemented with a microprocessor or the like, and may also include one or more graphics processing units (GPU) 2402 and/or a floating-point coprocessor for mathematical computations. In one or more embodiments, one or more GPUs 2402 may be incorporated within the display controller 2409, such as part of a graphics card or cards. The system 2400 may also include a system memory 2419, which may comprise RAM, ROM, or both.

A number of controllers and peripheral devices may also be provided, as shown in FIG. 24. An input controller 2403 represents an interface to various input device(s) 2404. The computing system 2400 may also include a storage controller 2407 for interfacing with one or more storage devices 2408 each of which includes a storage medium such as magnetic tape or disk, or an optical medium that might be used to record programs of instructions for operating systems, utilities, and applications, which may include embodiments of programs that implement various aspects of the present disclosure. Storage device(s) 2408 may also be used to store processed data or data to be processed in accordance with the disclosure. The system 2400 may also include a display controller 2409 for providing an interface to a display device 2411, which may be a cathode ray tube (CRT) display, a thin film transistor (TFT) display, organic light-emitting diode, electroluminescent panel, plasma panel, or any other type of display. The computing system 2400 may also include one or more peripheral controllers or interfaces 2405 for one or more peripherals 2406. Examples of peripherals may include one or more printers, scanners, input devices, output devices, sensors, and the like. A communications controller 2414 may interface with one or more communication devices 2415, which enables the system 2400 to connect to remote devices through any of a variety of networks including the Internet, a cloud resource (e.g., an Ethernet cloud, a Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals. As shown in the depicted embodiment, the computing system 2400 comprises one or more fans or fan trays 2418 and a cooling subsystem controller or controllers 2417 that monitors thermal temperature(s) of the system 2400 (or components thereof) and operates the fans/fan trays 2418 to help regulate the temperature.

In the illustrated system, all major system components may connect to a bus 2416, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable media including, for example: magnetic media such as hard disks, floppy disks, and magnetic tape; optical media such as compact discs (CDs) and holographic devices; magneto-optical media; and hardware devices that are specially configured to store or to store and execute program code, such as application specific integrated circuits (ASICs), programmable logic devices (PLDs), flash memory devices, other non-volatile memory (NVM) devices (such as 3D XPoint-based devices), and ROM and RAM devices.

Aspects of the present disclosure may be encoded upon one or more non-transitory computer-readable media with instructions for one or more processors or processing units to cause steps to be performed. It shall be noted that non-transitory computer-readable media shall include volatile and/or non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that has computer code thereon for performing various computer-implemented/processor-implemented operations. The media and computer code may be those specially designed and constructed for the purposes of the present disclosure, or they may be of the kind known or available to those having skill in the relevant arts. Examples of tangible computer-readable media include, for example: magnetic media such as hard disks, floppy disks, and magnetic tape; optical media such as CDs and holographic devices; magneto-optical media; and hardware devices that are specially configured to store or to store and execute program code, such as ASICs, PLDs, flash memory devices, other non-volatile memory devices (such as 3D XPoint-based devices), and ROM and RAM devices. Examples of computer code include machine code, such as produced by a compiler, and files containing higher-level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

Note that some or all of the components as shown and described above may be implemented in software, hardware, or a combination thereof. For example, such components can be implemented as software installed and stored in a persistent storage device, which can be loaded and executed in a memory by a processor to carry out the processes or operations described throughout this application. Alternatively, such components can be implemented as executable code programmed or embedded into dedicated hardware such as an integrated circuit (e.g., an application-specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to convey the substance of their work most effectively to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer-readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read-only memory ("ROM"), random access memory ("RAM"), magnetic disk storage media, optical storage media, flash memory devices).

The processes or methods depicted in the preceding figures may be performed by processing logic that comprises hardware (e.g., circuitry, dedicated logic, etc.), software (e.g., embodied on a non-transitory computer-readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations. The specification and drawings are, accordingly, to be regarded in an illustrative sense rather than a restrictive sense.

What is claimed is:

1. A processor-implemented method for autonomously operating a vehicle that is on a road, the method comprising:
   determining a target wheel angle using a controller unit and a set of inputs related to the vehicle;
   determining a wheel direction given road conditions obtained using one or more inputs;
   causing front wheels of the vehicle to be moved in the wheel direction;
   monitoring, using one or more sensors, an angle of at least one of the front wheels and torque of at least one of the front wheels;
   responsive to the front wheels of the vehicle reaching, with a threshold level, the target wheel angle while maintaining a torque below a target torque value:
      causing the front wheels of the vehicle to stop being moved in the wheel direction; and
      causing one or more braking systems of the vehicle to be set for a parked mode; and
   responsive to detecting that at least one of the front wheels of the vehicle has reached the target torque value before the target wheel angle has been reached:
      causing the front wheels to be moved in an opposite direction to the wheel direction; and
      responsive to a stop condition not being met, returning to the step of causing, via the controller system, the front wheels of the vehicle to be moved in the wheel direction.

2. The processor-implemented method of claim 1 wherein the step of determining a target wheel angle using a controller unit and a set of inputs related to the vehicle comprises:
   determining a target wheel angle given an estimate of the vehicle's weight and one or more road conditions, which comprises at least an estimate of a slope of the road.

3. The processor-implemented method of claim 1 wherein the step of determining a wheel direction given road conditions obtained using one or more inputs comprises:
   determining, given the one or more inputs, whether:
      the road is sloped uphill, downhill, or level; and
      the road has a curb or no curb; and
   determining the wheel direction for the front wheels given whether the road is sloped uphill, downhill, or level and whether the road has a curb or no curb.

4. The processor-implemented method of claim 1 wherein the step of causing the front wheels to be moved in an opposite direction to the wheel direction comprises:
   causing the front wheels to be moved in an opposite direction to the wheel direction by a set amount based upon a preset angle, by a preset distance, or by a preset percentage of rotation.

5. The processor-implemented method of claim 1 further comprising, following the step of responsive to detecting that at least one of the front wheels of the vehicle has reached the target torque value before the target wheel angle has been reached:
   incrementing a counter;
   determining whether the incremented counter has reached a counter limit;
   responsive to the incremented counter having not reached the counter limit,
      determining a target torque for a next iteration; and
   responsive to the incremented counter having reached the counter limit:
      causing the front wheels to be moved with a range comprising a maximum angle that is available that keeps the target torque below a maximum target torque; and
      responsive to the front wheels achieving an angle that is within the range, causing one or more braking systems of the vehicle to be set for a parked mode.

6. The processor-implemented method of claim 5 wherein the step of determining a target torque for a next iteration comprises:
   selecting as the target torque for the next iteration whichever is smaller:
      the maximum target torque; or
      an increased target torque that has been increased according to a table or formula.

7. The processor-implemented method of claim 5 further comprising:
   responsive to the front wheels not achieving an angle that is within the range before reaching the maximum target torque, taking one or more actions.

8. The processor-implemented method of claim 7 wherein the one or more actions comprises one or more of the following comprising:
   causing the vehicle to adjust itself relative to the curb and attempting parking again;
   causing additional braking to be applied; and
   causing the vehicle to move to a different location.

9. A system comprising:
   one or more processors; and
   a non-transitory computer-readable medium or media comprising one or more sets of instructions which, when executed by at least one of the one or more processors, causes steps to be performed comprising:
      determining a target wheel angle using a controller unit and a set of inputs related to a vehicle or a road;
      determining a wheel direction given road conditions obtained using one or more inputs;
      causing front wheels of the vehicle to be moved in the wheel direction;
      monitoring, using one or more sensors, an angle of at least one of the front wheels and torque of at least one of the front wheels;
      responsive to the front wheels of the vehicle reaching, with a threshold level, the target wheel angle while maintaining a torque below a target torque value:
         causing the front wheels of the vehicle to stop being moved in the wheel direction; and
         causing one or more braking systems of the vehicle to be set for a parked mode; and responsive to detecting that at least one of the front wheels of the vehicle has reached the target torque value before the target wheel angle has been reached:
    causing the front wheels to be moved in an opposite direction to the wheel direction; and
    responsive to a stop condition not being met, returning to the step of causing, via the controller system, the front wheels of the vehicle to be moved in the wheel direction.

10. The system of claim 9 wherein the step of determining a target wheel angle using a controller unit and a set of inputs related to the vehicle comprises:
    determining a target wheel angle given an estimate of the vehicle's weight and one or more road conditions, which comprises at least an estimate of a slope of the road.

11. The system of claim 9 wherein the step of determining a wheel direction given road conditions obtained using one or more inputs comprises:
    determining, given the one or more inputs, whether:
        the road is sloped uphill, downhill, or level; and
        the road has a curb or no curb; and
    determining the wheel direction for the front wheels given whether the road is sloped uphill, downhill, or level and whether the road has a curb or no curb.

12. The system of claim 9 wherein the step of causing the front wheels to be moved in an opposite direction to the wheel direction comprises:
    causing the front wheels to be moved in an opposite direction to the wheel direction by a set amount based upon a preset angle, by a preset distance, or by a preset percentage of rotation.

13. The system of claim 9 further comprising, following the step of responsive to detecting that at least one of the front wheels of the vehicle has reached the target torque value before the target wheel angle has been reached:
    incrementing a counter;
    determining whether the incremented counter has reached a counter limit;
    responsive to the incremented counter having not reached the counter limit, determining a target torque for a next iteration; and
    responsive to the incremented counter having reached the counter limit:
        causing the front wheels to be moved with a range comprising a maximum angle that is available that keeps the target torque below a maximum target torque; and
        responsive to the front wheels achieving an angle that is within the range, causing one or more braking systems of the vehicle to be set for a parked mode.

14. The system of claim 13 wherein the step of determining a target torque for a next iteration comprises:
    selecting as the target torque for the next iteration whichever is smaller:
        the maximum target torque; or
        an increased target torque that has been increased according to a table or formula.

15. The system of claim 13 further comprising:
    responsive to the front wheels not achieving an angle that is within the range before reaching the maximum target torque, taking one or more actions comprising:
        causing the vehicle to adjust itself relative to the curb and attempting parking again;
        causing additional braking to be applied; and
        causing the vehicle to move to a different location.

16. A non-transitory computer-readable medium or media comprising one or more sequences of instructions which, when executed by at least one processor, causes steps to be performed comprising:
    determining a target wheel angle using a controller unit and a set of inputs related to a vehicle that is on a road;
    determining a wheel direction given road conditions obtained using one or more inputs;
    causing front wheels of the vehicle to be moved in the wheel direction;
    monitoring, using one or more sensors, an angle of at least one of the front wheels and torque of at least one of the front wheels;
    responsive to the front wheels of the vehicle reaching, with a threshold level, the target wheel angle while maintaining a torque below a target torque value:
        causing the front wheels of the vehicle to stop being moved in the wheel direction; and
        causing one or more braking systems of the vehicle to be set for a parked mode; and
    responsive to detecting that at least one of the front wheels of the vehicle has reached the target torque value before the target wheel angle has been reached:
        causing the front wheels to be moved in an opposite direction to the wheel direction; and
        responsive to a stop condition not being met, returning to the step of causing, via the controller system, the front wheels of the vehicle to be moved in the wheel direction.

17. The non-transitory computer-readable medium or media of claim 16 wherein the step of determining a target wheel angle using a controller unit and a set of inputs related to the vehicle comprises:
    determining a target wheel angle given an estimate of the vehicle's weight and one or more road conditions, which comprises at least an estimate of a slope of the road; and
    wherein the step of determining a wheel direction given road conditions obtained using one or more inputs comprises:
        determining, given the one or more inputs, whether:
            the road is sloped uphill, downhill, or level; and
            the road has a curb or no curb; and
        determining the wheel direction for the front wheels given whether the road is sloped uphill, downhill, or level and whether the road has a curb or no curb.

18. The non-transitory computer-readable medium or media of claim 16 wherein the step of causing the front wheels to be moved in an opposite direction to the wheel direction comprises:
    causing the front wheels to be moved in an opposite direction to the wheel direction by a set amount based upon a preset angle, by a preset distance, or by a preset percentage of rotation.

19. The non-transitory computer-readable medium or media of claim 16 further comprising one or more sequences of instructions which, when executed by at least one processor, causes to be performed, following the step of responsive to detecting that at least one of the front wheels of the vehicle has reached the target torque value before the target wheel angle has been reached, steps comprising:
    incrementing a counter;
    determining whether the incremented counter has reached a counter limit;
    responsive to the incremented counter having not reached the counter limit, determining a target torque for a next iteration; and responsive to the incremented counter having reached the counter limit:
 causing the front wheels to be moved with a range comprising a maximum angle that is available that keeps the target torque below a maximum target torque; and
 responsive to the front wheels achieving an angle that is within the range, causing one or more braking systems of the vehicle to be set for a parked mode.

20. The non-transitory computer-readable medium or media of claim 19 further comprising one or more sequences of instructions which, when executed by at least one processor, causes steps to be performed comprising further comprising:
 responsive to the front wheels not achieving an angle that is within the range before reaching the maximum target torque, taking one or more actions.

\* \* \* \* \*